US012444819B2

(12) United States Patent
Ikemoto et al.

(10) Patent No.: US 12,444,819 B2
(45) Date of Patent: Oct. 14, 2025

(54) TRANSMISSION LINE AND ELECTRONIC DEVICE

(71) Applicant: Murata Manufacturing Co., Ltd., Nagaokakyo (JP)

(72) Inventors: Nobuo Ikemoto, Nagaokakyo (JP); Noriaki Okuda, Nagaokakyo (JP); Kosuke Nishio, Nagaokakyo (JP); Keisuke Araki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 269 days.

(21) Appl. No.: 18/200,011

(22) Filed: May 22, 2023

(65) Prior Publication Data

US 2023/0299452 A1 Sep. 21, 2023

Related U.S. Application Data

(63) Continuation of application No. PCT/JP2021/041331, filed on Nov. 10, 2021.

(30) Foreign Application Priority Data

Nov. 30, 2020 (JP) ................................ 2020-198384
Apr. 5, 2021 (JP) ................................ 2021-064252

(51) Int. Cl.
*H01P 3/08* (2006.01)

(52) U.S. Cl.
CPC ................ *H01P 3/08* (2013.01); *H01P 3/085* (2013.01)

(58) Field of Classification Search
CPC .. H01P 3/08; H01P 3/085; H01P 3/081; H01P 3/082; H01P 3/088

(Continued)

(56) References Cited

U.S. PATENT DOCUMENTS

2018/0196192 A1* 7/2018 Hu .......................... B32B 3/266
2018/0309182 A1 10/2018 Iida et al.

FOREIGN PATENT DOCUMENTS

JP S63200545 A 8/1988
JP 6330977 B2 5/2018
WO 2017130731 A1 8/2017

OTHER PUBLICATIONS

International Search Report in PCT/JP2021/041331, mailed Jan. 25, 2022, 3 pages.

(Continued)

*Primary Examiner* — Stephen E. Jones

(74) *Attorney, Agent, or Firm* — Keating & Bennett, LLP

(57) ABSTRACT

In a transmission line, a multilayer body includes a hollow portion above a signal conductor layer and below a ground conductor layer and overlapping the ground conductor layer when viewed in an up-down direction, and a spacer facing the hollow portion. In a cross section orthogonal to a front-back direction, an overlapping region is a region in the hollow portion in which the hollow portion overlaps the spacer in the up-down direction. In a cross section orthogonal to the front-back direction, a non-overlapping region is a region in the hollow portion in which the hollow portion does not overlap the spacer in the up-down direction. A length of the hollow portion in the up-down direction in the overlapping region is shorter than a length of the hollow portion in the up-down direction in the non-overlapping region.

20 Claims, 21 Drawing Sheets

(58) Field of Classification Search
USPC .......................................................... 333/238
See application file for complete search history.

(56) References Cited

OTHER PUBLICATIONS

Written Opinion in PCT/JP2021/041331, mailed Jan. 25, 2022, 3 pages.

* cited by examiner

10

TRANSMISSION LINE AND ELECTRONIC DEVICE

CROSS REFERENCE TO RELATED APPLICATIONS

This application claims the benefit of priority to Japanese Patent Application No. 2020-198384 filed on Nov. 30, 2020 and Japanese Patent Application No. 2021-064252 filed on Apr. 5, 2021, and is a Continuation Application of PCT Application No. PCT/JP2021/041331 filed on Nov. 10, 2021. The entire contents of each application are hereby incorporated herein by reference.

BACKGROUND OF THE INVENTION

1. Field of the Invention

The present invention relates to a transmission line through which a high frequency signal is transmitted and an electronic device.

2. Description of the Related Art

As an invention relating to a transmission line in the related art, for example, a signal transmission line described in Japanese Patent No. 6330977 has been known. The signal transmission line includes a multilayer body, a signal conductor, and a reinforcing conductor. The multilayer body has a structure in which a plurality of resin layers is laminated in an up-down direction. The multilayer body includes a hollow portion. The signal conductor overlaps the hollow portion when viewed in the up-down direction. The reinforcing conductor extends in the up-down direction in the hollow portion. The upper end of the reinforcing conductor is in contact with the upper surface of the hollow portion. The lower end of the reinforcing conductor is in contact with the lower surface of the hollow portion.

SUMMARY OF THE INVENTION

There is a demand for more easily bending the signal transmission line described in Japanese Patent No. 6330977.

Therefore, preferred embodiments of the present invention provide transmission lines that each can be easily bent, and electronic devices.

A transmission line according to a preferred embodiment of the present invention includes a multilayer body with a structure in which a plurality of insulator layers is laminated in an up-down direction where one of an up direction and a down direction is a first direction and another one of the up direction and the down direction is a second direction, a signal conductor layer in the multilayer body and extending in a front-back direction orthogonal to the up-down direction, and a first ground conductor layer in the multilayer body and extending the first direction of the signal conductor layer to overlap the signal conductor layer when viewed in the up-down direction, in which the multilayer body includes a first hollow portion, the first hollow portion extends farther in the first direction than the signal conductor layer and extends in the second direction of the first ground conductor layer, the first hollow portion overlaps the first ground conductor layer when viewed in the up-down direction, the multilayer body includes a first spacer that faces the first hollow portion, in a cross section orthogonal to the front-back direction, a first overlapping region is a region in the first hollow portion in which the first hollow portion overlaps the first spacer in the up-down direction, in a cross section orthogonal to the front-back direction, a first non-overlapping region is a region in the first hollow portion in which the first hollow portion does not overlap the first spacer in the up-down direction, and a length of the first hollow portion in the up-down direction in the first overlapping region is shorter than a length of the first hollow portion in the up-down direction in the first non-overlapping region.

A transmission line according to a preferred embodiment of the present invention includes a multilayer body with a structure in which a plurality of insulator layers is laminated in an up-down direction where one of an up direction and a down direction is a first direction and another one of the up direction and the down direction is a second direction, a signal conductor layer in the multilayer body and extending in a front-back direction orthogonal to the up-down direction, and a first ground conductor layer in the multilayer body and extending the first direction of the signal conductor layer to overlap the signal conductor layer when viewed in the up-down direction, in which the transmission line includes a first section and a second section, the first section is bent in the up-down direction in the second section with respect to the second section, the first section has a curvature radius that is smaller than a curvature radius of the second section, the multilayer body includes a first hollow portion extending in the first direction of the signal conductor layer and extending farther in the second direction than the first ground conductor layer, the first hollow portion overlaps the first ground conductor layer when viewed in the up-down direction, in the first section, the multilayer body includes a first spacer that faces the first hollow portion, and in the first section, a length of the first spacer in the up-down direction is equal to or less than a maximum value of a length of the first hollow portion in the up-down direction.

An electronic device according to a preferred embodiment of the present invention includes a transmission line according to a preferred embodiment of the present invention.

According to transmission lines and electronic devices according to preferred embodiments of the present invention, the transmission lines can be easily bent.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment

Structure of Transmission Line

Figure 1:
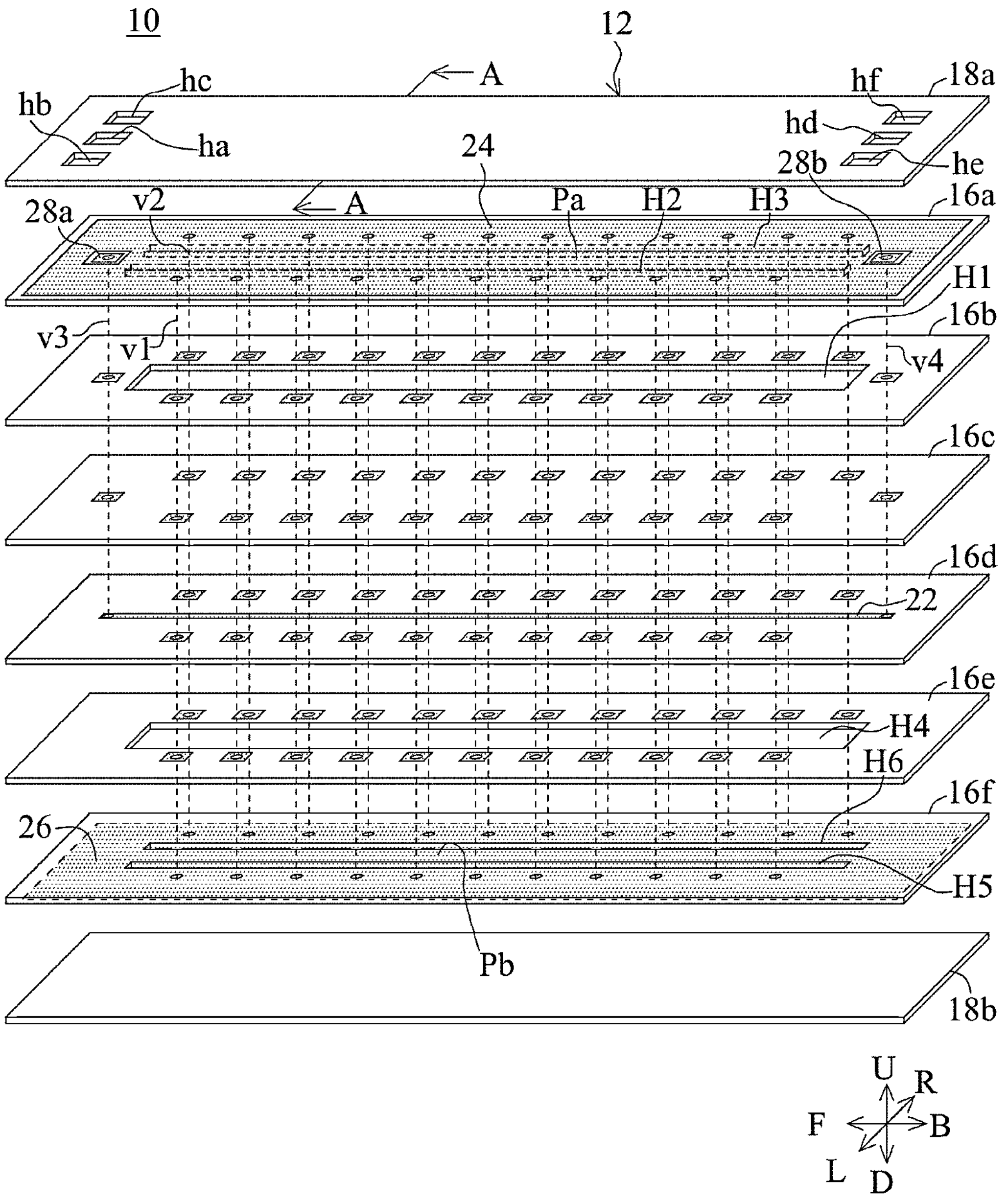
FIG. 1 is an exploded perspective view of a transmission line 10.
Figure 2:
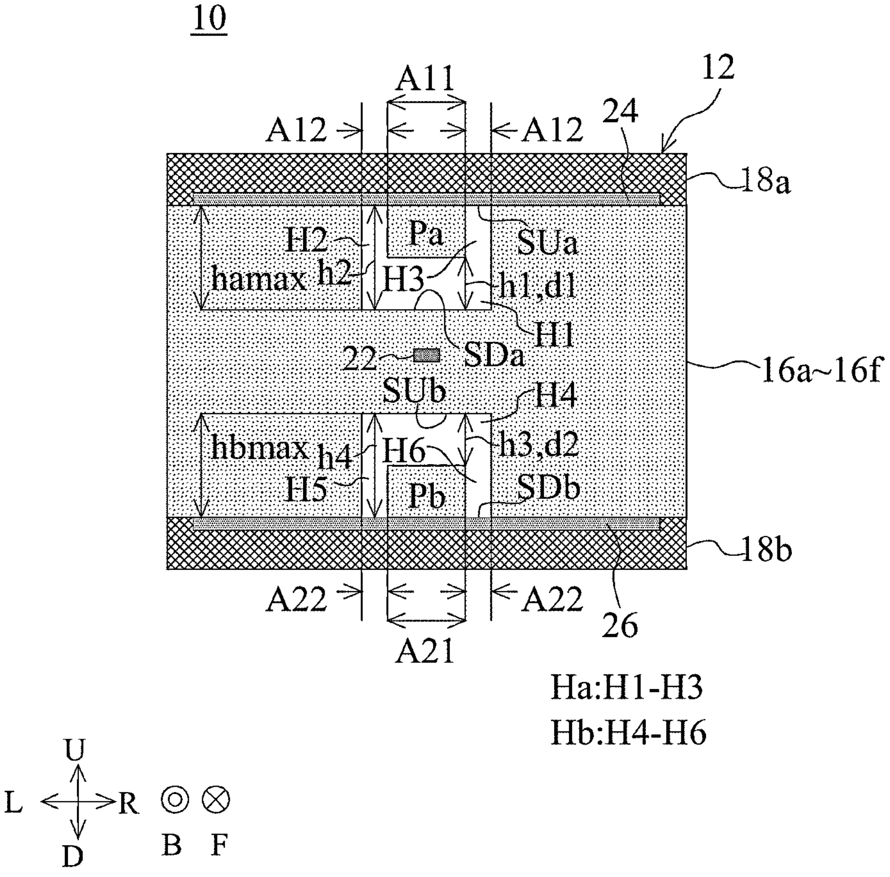
FIG. 2 is a cross-sectional view cut along line A-A of FIG. 1.

Hereinafter, a structure of a transmission line 10 according to a preferred embodiment of the present invention will be described with reference to the drawings. FIG. 1 is an exploded perspective view of the transmission line 10. Note that in FIG. 1, among a plurality of interlayer connection conductors v1 and a plurality of interlayer connection conductors v2, only representative interlayer connection conductors v1 and v2 are denoted by reference numerals. FIG. 2 is a cross-sectional view cut along line A-A of FIG. 1.

In the specification, directions are defined as follows. A laminating direction of a multilayer body 12 of the transmission line 10 is defined as an up-down direction. In addition, a direction in which a signal conductor layer 22 of the transmission line 10 extends is defined as a front-back direction. In addition, a line width direction of the signal conductor layer 22 is defined as a left-right direction. The up-down direction is orthogonal to the front-back direction. The left-right direction is orthogonal to the up-down direction and the front-back direction. Note that an up direction is an example of a first direction. A down direction is an example of a second direction. In this case, an end located in the first direction is an upper end. An end located in the second direction is a lower end. A surface located in the first direction is an upper surface. A surface located in the second direction is a lower surface. A main surface located in the first direction is an upper main surface. A main surface located in the second direction is a lower main surface. Note that the up direction may be the second direction. The down direction may be the first direction.

Hereinafter, X is a component or a member of the transmission line 10. In the specification, each portion of X is defined as follows, unless otherwise noted. A front portion of X refers to the front half of X. A back portion of X refers to the back half of X. A left portion of X refers to the left half of X. A right portion of X refers to the right half of X. An upper portion of X refers to the upper half of X. A lower portion of X refers to the lower half of X. A front end of X refers to the end in the front direction of X. A back end of X refers to the end in the back direction of X. A left end of X refers to the end in the left direction of X. A right end of X refers to the end in the right direction of X. An upper end of X refers to the end in the up direction of X. A lower end of X refers to the end in the down direction of X. A front end portion of X refers to the front end of X and the vicinity thereof. A back end portion of X refers to the back end of X and the vicinity thereof. A left end portion of X refers to the left end of X and the vicinity thereof. A right end portion of X refers to a right end of X and the vicinity thereof. An upper end portion of X refers to the upper end of X and the vicinity thereof. A lower end portion of X refers to the lower end of X and the vicinity thereof.

First, with reference to FIG. 1, the structure of the transmission line 10 will be described. The transmission line 10 transmits a high frequency signal. The transmission line 10 is used to electrically connect two circuits in an electronic device such as a smartphone. As illustrated in FIG. 1, the transmission line 10 includes the multilayer body 12, the signal conductor layer 22, a first ground conductor layer 24, a second ground conductor layer 26, signal terminals 28*a* and 28*b*, the plurality of interlayer connection conductors v1, the plurality of interlayer connection conductors v2, and interlayer connection conductors v3 and v4.

The multilayer body 12 has a plate shape. Therefore, the multilayer body 12 includes an upper main surface and a lower main surface. The upper main surface and the lower main surface of the multilayer body 12 each have a rectangular or substantially rectangular shape having a long side extending in the front-back direction. Therefore, the length of the multilayer body 12 in the front-back direction is greater than the length of the multilayer body 12 in the left-right direction.

As illustrated in FIG. 1, the multilayer body 12 includes insulator layers 16*a* to 16*f*, and 18*a* and 18*b*. The multilayer body 12 has a structure in which the insulator layers 16*a* to 16*f*, and 18*a* and 18*b* are laminated in the up-down direction. The insulator layers 18*a*, 16*a* to 16*f*, and 18*b* are arranged in this order from up to down. The insulator layers 16*a* to 16*f*, and 18*a* and 18*b* each have the same rectangular or substantially rectangular shape as the multilayer body 12 when viewed in the up-down direction. The insulator layers 16*a* to 16*f* are flexible dielectric sheets. The material of the insulator layers 16*a* to 16*f* is, for example, a thermoplastic resin. The thermoplastic resin is, for example, a thermoplastic resin of a liquid-crystal polymer, polytetrafluoroethylene (PTFE), or the like. The material of the insulator layers 16*a* to 16*f* may be polyimide.

As illustrated in FIG. 1, the signal conductor layer 22 is provided in the multilayer body 12. In the present preferred embodiment, the signal conductor layer 22 is provided on the upper main surface of the insulator layer 16*d*. As a result, the signal conductor layer 22 is provided in the multilayer body 12. The signal conductor layer 22 has a line shape. The signal conductor layer 22 extends in the front-back direction orthogonal to the up-down direction. The signal conductor layer 22 is located in the center in the left-right direction of the upper main surface of the insulator layer 16*d*.

As illustrated in FIG. 1, the first ground conductor layer 24 is provided in the multilayer body 12. The first ground conductor layer 24 is provided above the signal conductor layer 22 so as to overlap the signal conductor layer 22 when viewed in the up-down direction. The first ground conductor layer 24 is provided on the upper main surface of the insulator layer 16*a*. In addition, the first ground conductor layer 24 covers substantially the entire surface of the upper main surface of the insulator layer 16*a*.

As illustrated in FIG. 1, the second ground conductor layer 26 is provided in the multilayer body 12. The second ground conductor layer 26 is provided below the signal conductor layer 22 so as to overlap the signal conductor layer 22 when viewed in the up-down direction. The second ground conductor layer 26 is provided on the lower main surface of the insulator layer 16*f*. In addition, the second ground conductor layer 26 covers substantially the entire surface of the lower main surface of the insulator layer 16*f*. The signal conductor layer 22, the first ground conductor layer 24, and the second ground conductor layer 26 described above have a strip line structure.

The pluralities of interlayer connection conductors v1 and v2 electrically connect the first ground conductor layer 24 to the second ground conductor layer 26. More precisely, the pluralities of interlayer connection conductors v1 and v2 pass through the insulator layers 16*a* to 16*e* in the up-down direction. The upper ends of the pluralities of interlayer connection conductors v1 and v2 are connected to the first ground conductor layer 24. The lower ends of the pluralities of interlayer connection conductors v1 and v2 are connected to the second ground conductor layer 26. The plurality of interlayer connection conductors v1 is provided on the left side of the signal conductor layer 22. The plurality of interlayer connection conductors v1 are arranged in a line in the front-back direction at equal or substantially equal intervals. The plurality of interlayer connection conductors v2 is provided on the right side of the signal conductor layer 22. The plurality of interlayer connection conductors v2 are arranged in a line in the front-back direction at equal intervals.

The signal terminal 28*a* is provided at the upper main surface of the multilayer body 12. More precisely, the signal terminal 28*a* is provided in the front end portion of the upper main surface of the insulator layer 16*a*. The signal terminal 28*a* overlaps the front end portion of the signal conductor layer 22 when viewed in the up-down direction. The signal terminal 28*a* has a rectangular or substantially rectangular shape when viewed in the up-down direction. In addition, the first ground conductor layer 24 is not in contact with the signal terminal 28*a* so that the signal terminal 28*a* is insulated from the first ground conductor layer 24.

The interlayer connection conductor v3 electrically connects the signal terminal 28*a* to the signal conductor layer 22. Specifically, the interlayer connection conductor v3 passes through the insulator layers 16*a* to 16*c* in the up-down direction. The upper end of the interlayer connection conductor v3 is connected to the signal terminal 28*a*. The lower end of the interlayer connection conductor v3 is connected to the front end portion of the signal conductor layer 22. As a result, the signal terminal 28*a* is electrically connected to the signal conductor layer 22. A high frequency signal is input to and output from the signal conductor layer 22 through the signal terminal 28*a*.

Note that the signal terminal 28*b* and the interlayer connection conductor v4 have structures symmetrical in the front-back direction to the structures of the signal terminal 28*a* and the interlayer connection conductor v3, respectively. Therefore, the description of the signal terminal 28*b* and the interlayer connection conductor v4 will be omitted.

The signal conductor layer 22, the first ground conductor layer 24, the second ground conductor layer 26, and the signal terminals 28*a* and 28*b* described above are formed by, for example, performing etching on metal foils provided on the upper main surfaces or the lower main surfaces of the insulator layers 16*a* to 16*f*. The metal foils are, for example, copper foils. In addition, the interlayer connection conductors v1 to v4 are, for example, via hole conductors. The via hole conductors are manufactured by forming through holes in the insulator layers 16*a* to 16*f*, filling the through holes with conductive paste, and sintering the conductive paste. The interlayer connection conductors v1 to v4 may be, for example, through hole conductors. The through hole conductors are manufactured by forming through holes passing through a portion or all of the insulator layers 16*a* to 16*f* and performing plating on the through holes.

The insulator layers 18*a* and 18*b* are protective layers. However, the material of the insulator layers 18*a* and 18*b* is different from the material of the insulator layers 16*a* to 16*f*. The insulator layers 18*a* and 18*b* are resist layers. Therefore, the insulator layers 18*a* and 18*b* may be formed by sticking a resin sheet to the upper main surface of the insulator layer 16*a* and the lower main surface of the insulator layer 16*f*, or may be formed by applying a liquid resin to the upper main surface of the insulator layer 16*a* and the lower main surface of the insulator layer 16*f* and solidifying the liquid resin. As illustrated in FIG. 1, the insulator layer 18*a* covers the first ground conductor layer 24. However, the insulator layer 18*a* includes openings ha to hf. The openings ha to hc are provided in the front end portion of the insulator layer 18*a*. The openings hb, ha, and hc are arranged in this order from the left to the right. The openings hd to hf are provided in the back end portion of the insulator layer 18*a*. The openings he, hd, and hf are arranged in this order from the left to the right. In addition, at least a portion of the signal terminals 28*a* and 28*b* is exposed to the outside from the transmission line 10 through the openings ha and hd, respectively. A portion of the first ground conductor layer 24 is exposed from the transmission line 10 through the openings hb, hc, he, and hf.

Next, with reference to FIGS. 1 to 3, a first hollow portion Ha and a second hollow portion Hb will be described. The first hollow portion Ha is provided in the multilayer body 12. The first hollow portion Ha is a hollow in which the insulator layers 16*a* to 16*f* do not exist. The first hollow portion Ha is located above the signal conductor layer 22 and below the first ground conductor layer 24. In the specification, "the first hollow portion Ha is located above the signal conductor layer 22" includes both of a case where the first hollow portion Ha is located right above the signal conductor layer 22 and a case where the first hollow portion Ha is located obliquely above the signal conductor layer 22. In the case where the first hollow portion Ha is located obliquely above the signal conductor layer 22, the first hollow portion Ha may overlap the signal conductor layer 22 when viewed in the up-down direction, or does not have to overlap the signal conductor layer 22. In the present preferred embodiment, the first hollow portion Ha overlaps the signal conductor layer 22 when viewed in the up-down direction. In addition, in the present preferred embodiment, "the first hollow portion Ha is located below the first ground conductor layer 24" indicates a case where the first hollow portion Ha is located right below the first ground conductor layer 24. Therefore, the first hollow portion Ha overlaps the first ground conductor layer 24 when viewed in the up-down direction. Note that the positional relationship between the first hollow portion Ha and the signal conductor layer 22 and the positional relationship between the first hollow portion Ha and the first ground conductor layer 24 are exemplified to describe the positional relationship between two members, but the above definition can be applied to the positional relationship between members other than the ones exemplified. In addition, the above definition can be applied to directions other than the up-down direction.

The first hollow portion Ha includes through holes H1 to H3. The through hole H1 passes through the insulator layer 16*b* in the up-down direction. The through hole H1 has a rectangular or substantially rectangular shape when viewed in the up-down direction. The long side of the through hole H1 extends in the front-back direction. The through hole H1 is located in the center in the left-right direction of the insulator layer 16*b* when viewed in the up-down direction. As a result, the through hole H1 overlaps the signal conductor layer 22 when viewed in the up-down direction. However, the through hole H1 does not overlap the front end portion of the signal conductor layer 22 or the back end portion of the signal conductor layer 22.

The through hole H2 passes through the insulator layer 16*a* in the up-down direction. The through hole H2 has a rectangular or substantially rectangular shape when viewed in the up-down direction. The long side of the through hole H2 extends in the front-back direction. The through hole H2 is located in the left portion of the insulator layer 16*a* when viewed in the up-down direction. The through hole H2 overlaps the through hole H1 when viewed in the up-down direction. Therefore, the through hole H2 is connected to the through hole H1. The through hole H2 does not overlap the signal conductor layer 22 when viewed in the up-down direction.

The through hole H3 passes through the insulator layer 16*a* in the up-down direction. The through hole H3 has a rectangular or substantially rectangular shape when viewed in the up-down direction. The long side of the through hole H3 extends in the front-back direction. The through hole H3 is located in the right portion of the insulator layer 16*a* when viewed in the up-down direction. The through hole H3 overlaps the through hole H1 when viewed in the up-down direction. Therefore, the through hole H3 is connected to the through hole H1. The through hole H3 does not overlap the signal conductor layer 22 when viewed in the up-down direction.

The first hollow portion Ha has the above structure, whereby a first spacer Pa facing the first hollow portion Ha is provided in the multilayer body 12. A surface of the first spacer Pa is a portion of an inner peripheral surface of the first hollow portion Ha. The inner peripheral surface of the first hollow portion Ha is an inner-side wall surface of the multilayer body 12 forming the first hollow portion Ha. The first spacer Pa projects downward from an upper surface SUa of the first hollow portion Ha. The first spacer Pa includes a lower surface facing downward. The upper surface SUa is a surface located at the upper end of the first hollow portion Ha in a cross section of the transmission line 10 that is orthogonal to the front-back direction. For example, in FIG. 2, the upper surface SUa is the upper surface of the through hole H2 and the upper surface of the through hole H3. The first spacer Pa is a portion located above the through hole H1 in the multilayer body 12 and located below the upper surface SUa in the multilayer body 12. In the cross section orthogonal to the front-back direction, the first hollow portion Ha exists on the left side and the right side of the first spacer Pa. More precisely, the through hole H2 is located on the left side of the first spacer Pa. The through hole H3 is located on the right side of the first spacer Pa. In addition, regardless of the position in the front-back direction of the cross section orthogonal to the front-back direction, the cross-sectional shape of the first spacer Pa is unchanged.

Here, in the cross section orthogonal to the front-back direction, a first overlapping region A11 is a region in the first hollow portion Ha in which the first hollow portion Ha overlaps the first spacer Pa in the up-down direction. In the cross section orthogonal to the front-back direction, a first non-overlapping region A12 is a region in the first hollow portion Ha in which the first hollow portion Ha does not overlap the first spacer Pa in the up-down direction. A length h1 of the first hollow portion Ha in the up-down direction in the first overlapping region A11 is shorter than a length h2 of the first hollow portion Ha in the up-down direction in the first non-overlapping region A12. The length h1 of the first hollow portion Ha in the up-down direction in the first overlapping region A11 is the length between the upper end and the lower end of the first hollow portion Ha in the up-down direction in the first overlapping region A11. The length h2 of the first hollow portion Ha in the up-down direction in the first non-overlapping region A12 is the length between the upper end and the lower end of the first hollow portion Ha in the up-down direction in the first non-overlapping region A12. In other words, a length d1 from the lower end of the first spacer Pa to a lower surface SDa of the first hollow portion Ha in the up-down direction is shorter than the length h2 of the first hollow portion Ha in the up-down direction in the first non-overlapping region A12. In the cross section orthogonal to the front-back direction, the length of the first spacer Pa in the up-down direction is shorter than a maximum value hamax of the first hollow portion Ha in the up-down direction. The maximum value hamax is the length in the up-down direction from the upper end to the lower end of the first hollow portion Ha.

The second hollow portion Hb has a structure symmetrical in the up-down direction to the first hollow portion Ha. The second hollow portion Hb is provided in the multilayer body 12. The second hollow portion Hb is a hollow in which the insulator layers 16*a* to 16*f* do not exist. The second hollow portion Hb is located below the signal conductor layer 22 and above the second ground conductor layer 26. Therefore, the second hollow portion Hb overlaps the second ground conductor layer 26 when viewed in the up-down direction.

The second hollow portion Hb includes the through holes H4 to H6. The through hole H4 passes through the insulator layer 16*e* in the up-down direction. The through hole H4 has a rectangular or substantially rectangular shape when viewed in the up-down direction. The long side of the through hole H4 extends in the front-back direction. The through hole H4 is located in the center in the left-right direction of the insulator layer 16*e* when viewed in the up-down direction. As a result, the through hole H4 overlaps the signal conductor layer 22 when viewed in the up-down direction. However, the through hole H4 does not overlap the front end portion of the signal conductor layer 22 or the back end portion of the signal conductor layer 22.

The through hole H5 passes through the insulator layer 16*f* in the up-down direction. The through hole H5 has a rectangular or substantially rectangular shape when viewed in the up-down direction. The long side of the through hole H5 extends in the front-back direction. The through hole H5 is located in the left portion of the insulator layer 16*f* when viewed in the up-down direction. The through hole H5 overlaps the through hole H4. Therefore, the through hole H5 is connected to the through hole H4. The through hole H5 does not overlap the signal conductor layer 22 when viewed in the up-down direction.

The through hole H6 passes through the insulator layer 16*f* in the up-down direction. The through hole H6 has a rectangular or substantially rectangular shape when viewed in the up-down direction. The long side of the through hole H6 extends in the front-back direction. The through hole H6 is located in the right portion of the insulator layer 16*f* when viewed in the up-down direction. The through hole H6 overlaps the through hole H4. Therefore, the through hole H6 is connected to the through hole H4. The through hole H6 does not overlap the signal conductor layer 22 when viewed in the up-down direction.

The second hollow portion Hb has the above structure, such that a second spacer Pb facing the second hollow portion Hb is provided in the multilayer body 12. A surface of the second spacer Pb is a portion of an inner peripheral surface of the second hollow portion Hb. The second spacer Pb projects upward from a lower surface SDb of the second hollow portion Hb. The second spacer Pb includes an upper surface facing upward. The lower surface SDb is a surface located at the lower end of the second hollow portion Hb in the cross section of the transmission line 10 that is orthogonal to the front-back direction. For example, in FIG. 2, the lower surface SDb is the lower surface of the through hole H6 and the lower surface of the through hole H5. The second spacer Pb is a portion located below the through hole H4 in the multilayer body 12 and located above the lower surface SDb in the multilayer body 12. In the cross section orthogonal to the front-back direction, the second hollow portion Hb exists on the left side and the right side of the second spacer Pb. More precisely, the through hole H5 is located on the left side of the second spacer Pb. The through hole H6 is located on the right side of the second spacer Pb. In addition, regardless of the position in the front-back direction of the cross section orthogonal to the front-back direction, the cross-sectional shape of the second spacer Pb is unchanged.

Here, in the cross section orthogonal to the front-back direction, a second overlapping region A21 is a region in the second hollow portion Hb in which the second hollow portion Hb overlaps the second spacer Pb in the up-down direction. In the cross section orthogonal to the front-back direction, a second non-overlapping region A22 is a region in the second hollow portion Hb in which the second hollow portion Hb does not overlap the second spacer Pb in the up-down direction. A length h3 of the second hollow portion Hb in the up-down direction in the second overlapping region A21 is shorter than a length h4 of the second hollow portion Hb in the up-down direction in the second non-overlapping region A22. The length h3 of the second hollow portion Hb in the up-down direction in the second overlapping region A21 is the length between the upper end and the lower end of the second hollow portion Hb in the up-down direction in the second overlapping region A21. The length h4 of the second hollow portion Hb in the up-down direction in the second non-overlapping region A22 is the length between the upper end and the lower end of the second hollow portion Hb in the up-down direction in the second non-overlapping region A22. In other words, a length d2 from the upper end of the second spacer Pb to an upper surface SUb of the second hollow portion Hb in the up-down direction is shorter than the length h4 of the second hollow portion Hb in the up-down direction in the second non-overlapping region A22. In the cross section orthogonal to the front-back direction, the length of the second spacer Pb in the up-down direction is shorter than a maximum value hbmax of the second hollow portion Hb in the up-down direction. The maximum value hbmax is the length in the up-down direction from the upper end to the lower end of the second hollow portion Hb.

Next, bending of the transmission line 10 will be described with reference to the drawings. FIG. 3 is a sectional view of the transmission line 10 when the transmission line 10 is bent with a large curvature radius. FIG. 4 is a cross-sectional view of the transmission line 10 of FIG. 3. FIG. 5 is a sectional view of the transmission line 10 when the transmission line 10 is bent with a small curvature radius. FIG. 6 is a cross-sectional view of the transmission line 10 of FIG. 5. FIGS. 3 and 5 are sectional views orthogonal to the left-right direction. FIGS. 4 and 6 are cross-sectional views orthogonal to the front-back direction.

Figure 3:
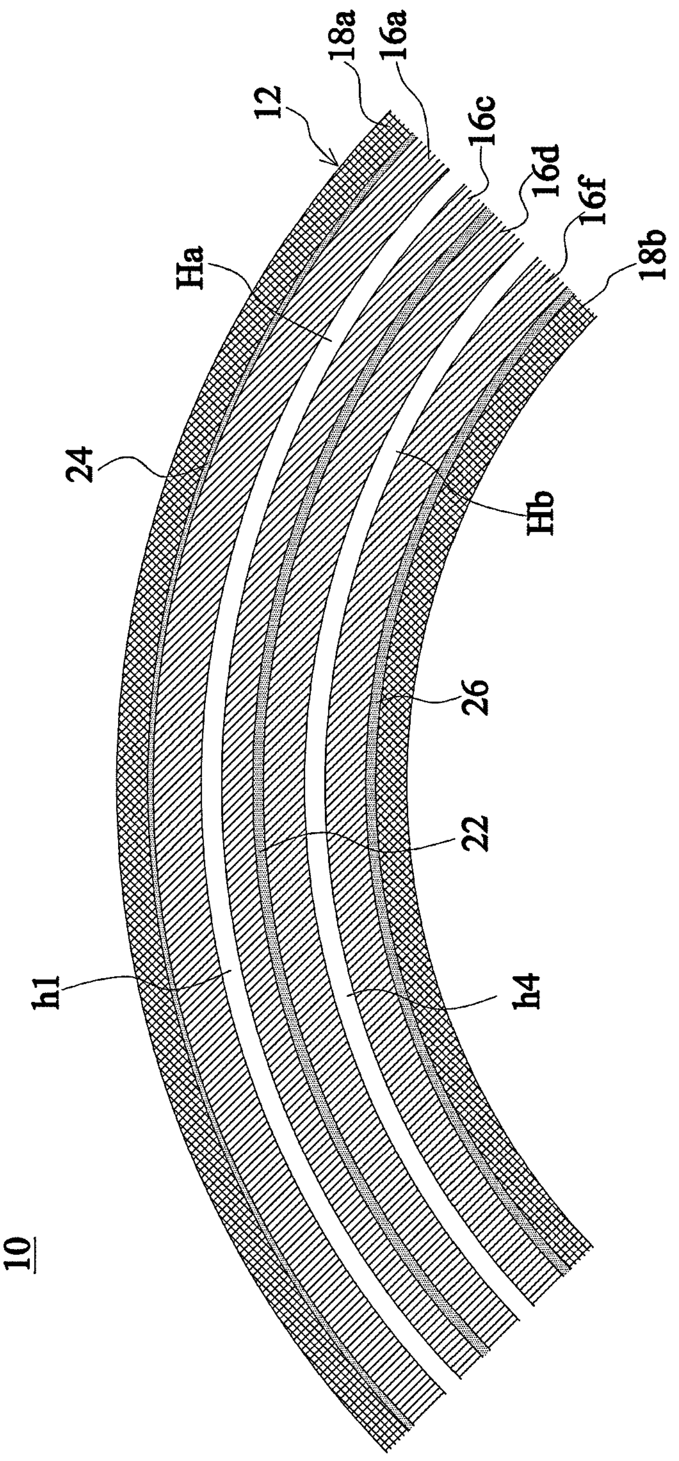
FIG. 3 is a sectional view of the transmission line 10 when the transmission line 10 is bent with a large curvature radius.
Figure 4:
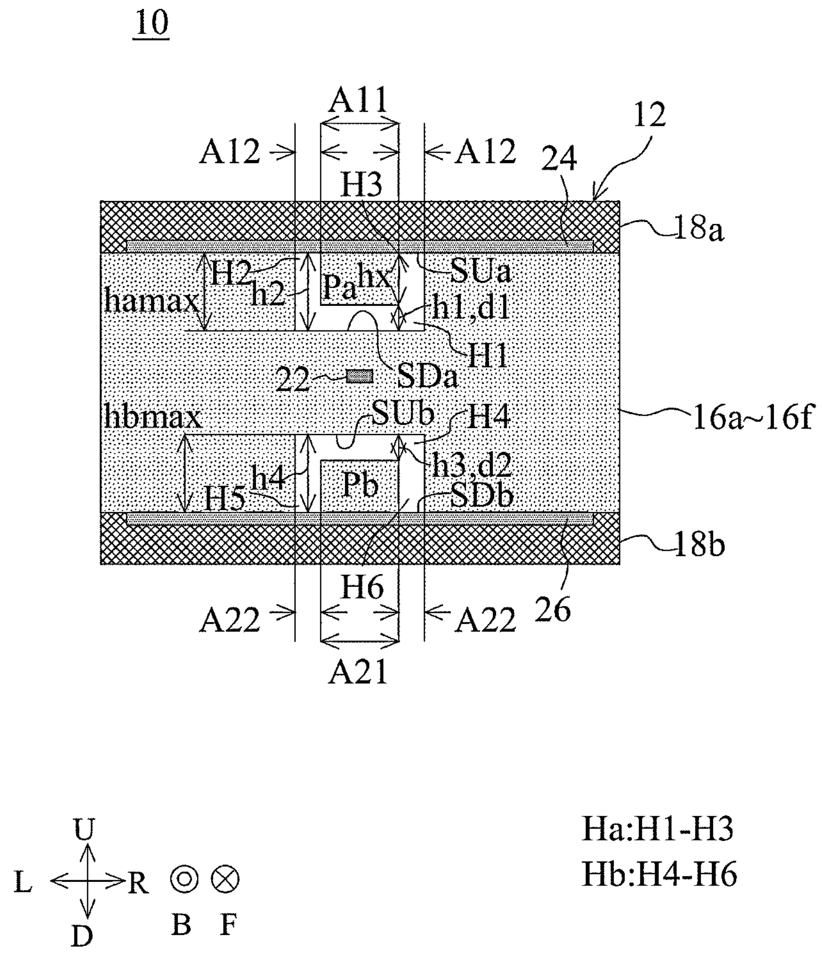
FIG. 4 is a cross-sectional view of the transmission line 10 of FIG. 3.
Figure 5:
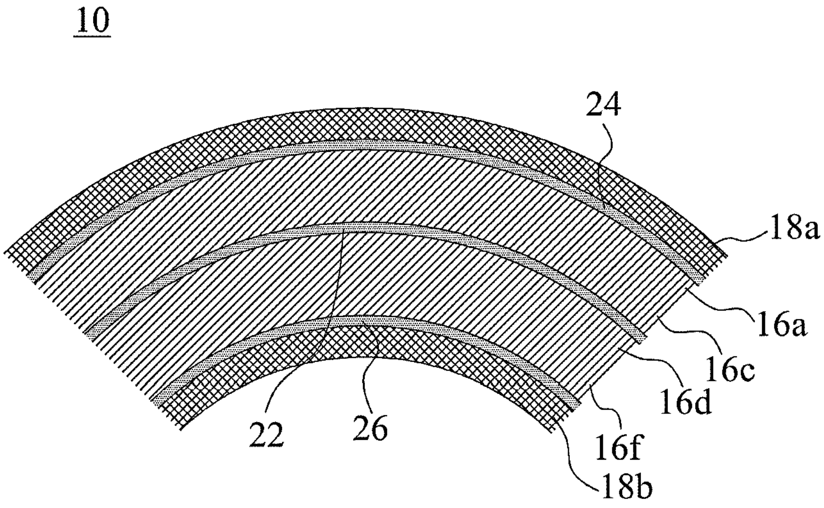
FIG. 5 is a sectional view of the transmission line 10 when the transmission line 10 is bent with a small curvature radius.
Figure 6:
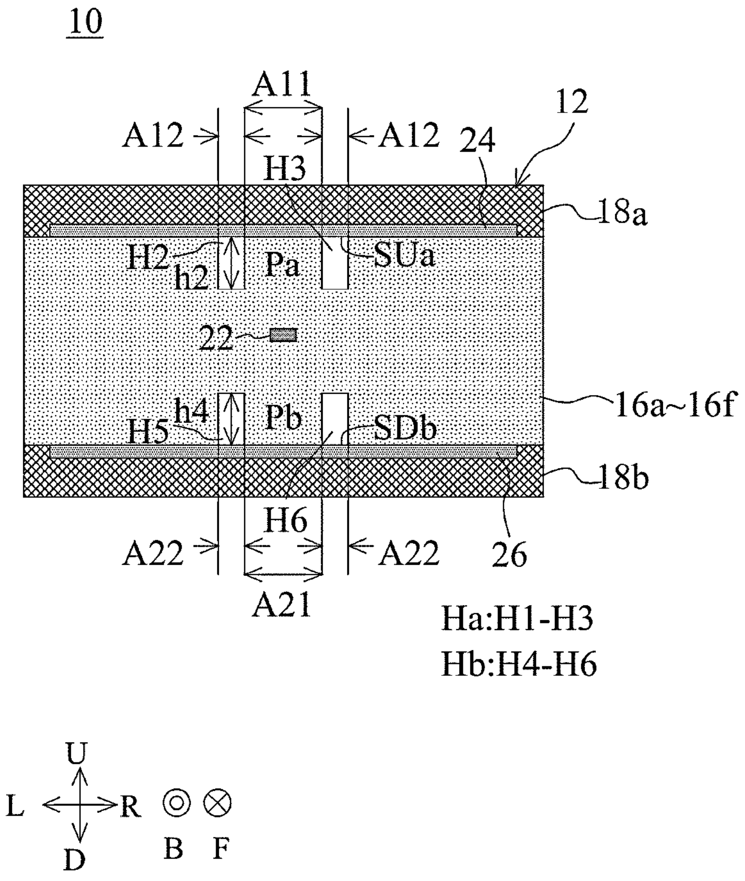
FIG. 6 is a cross-sectional view of the transmission line 10 of FIG. 5.

The transmission line 10 is bent as illustrated in FIGS. 3 to 5. "The transmission line 10 is bent" means that when an external force is added to the transmission line 10, the transmission line 10 is deformed and bent. The deformation may be elastic deformation, plastic deformation, or elastic deformation and plastic deformation.

As illustrated in FIGS. 3 and 4, in a case where the transmission line 10 is bent with a large curvature radius, the lower end of the first spacer Pa is not in contact with the lower surface SDa of the first hollow portion Ha. The upper end of the second spacer Pb is not in contact with the upper surface SUb of the second hollow portion Hb.

As illustrated in FIGS. 5 and 6, in a case where the transmission line 10 is bent with a small curvature radius, the lower end of the first spacer Pa is in contact with the lower surface SDa of the first hollow portion Ha. As a result, the first spacer Pa reduces or prevents large deformation of the first hollow portion Ha. The upper end of the second spacer Pb is in contact with the upper surface SUb of the second hollow portion Hb. As a result, the second spacer Pb functions as a spacer that reduces or prevents excessive deformation of the second hollow portion Hb.

Structure of Electronic Device

Figure 7:
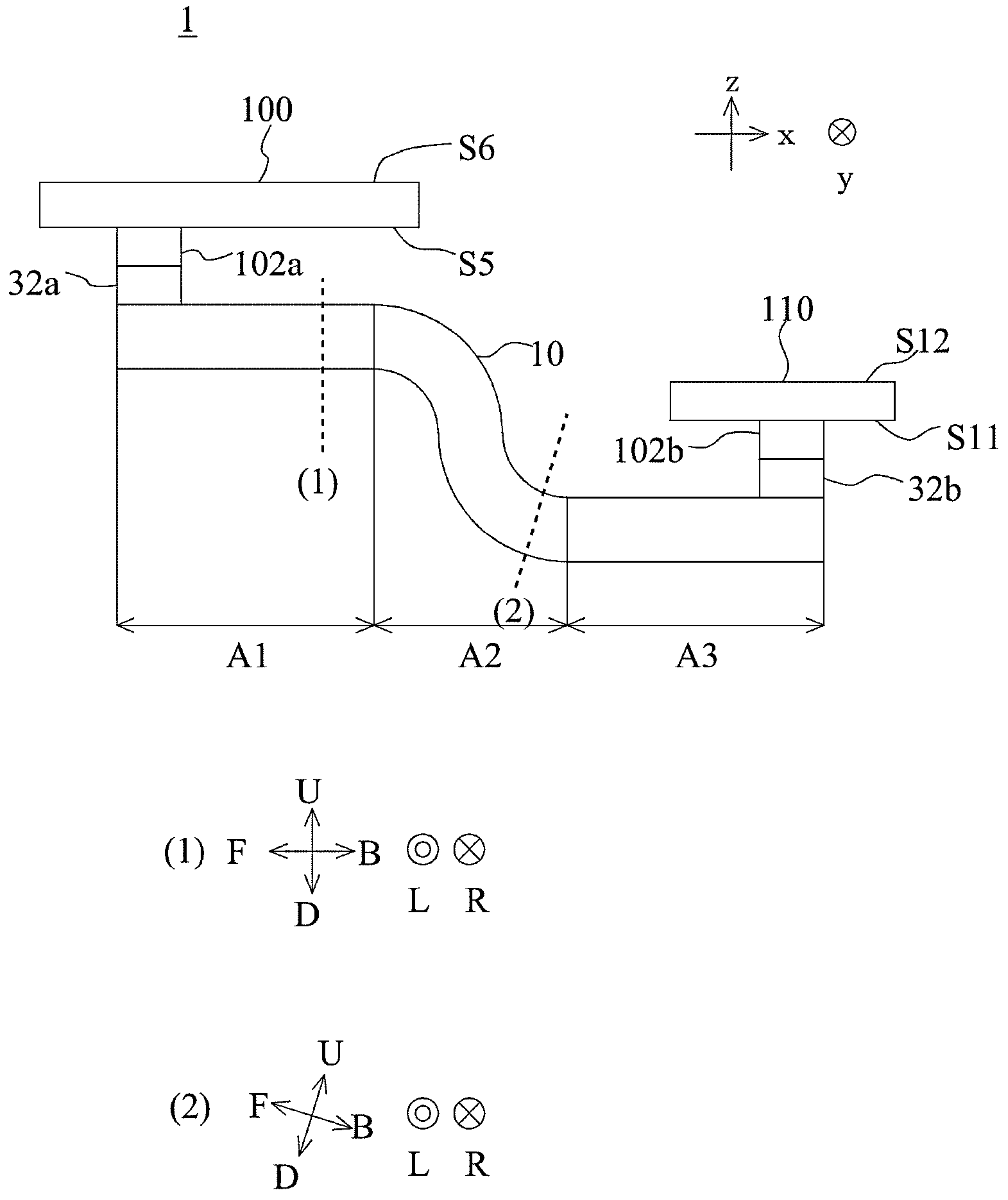
FIG. 7 is a left-side view of an internal structure of an electronic device 1 including the transmission line 10.

Next, a structure of an electronic device 1 including the transmission line 10 will be described with reference to the drawings. FIG. 7 is a left-side view of an internal structure of the electronic device 1 including the transmission line 10. The electronic device 1 is, for example, a wireless mobile communication terminal. The electronic device 1 is, for example, a smartphone.

The transmission line 10 includes a first section A2 and second sections A1 and A3. The first section A2 is a section in which the transmission line 10 is bent. The second sections A1 and A3 are sections in which the transmission line 10 is not bent. That is, the curvature radius of the first section is smaller than the curvature radius of the second section. Therefore, the transmission line 10 may be bent in the second sections A1 and A3 as well. In addition, an x-axis, a y-axis, and a z-axis in the electronic device 1 will be defined as follows. The x-axis is the front-back direction in the second section A1. The y-axis is the left-right direction in the second section A1. The z-axis is the up-down direction in the second section A1. The second section A1, the first section A2, and the second section A3 are arranged in this order in the positive direction of the x-axis.

As illustrated in FIG. 7, the first section A2 is bent in the z-axis direction (the up-down direction in the second section A1) with respect to the second section A1. Therefore, as illustrated in FIG. 7, the up-down direction and the front-back direction are different depending on the position of the transmission line 10. In the second section A1 (for example, at the position of (1)) in which the multilayer body 12 is not bent, the up-down direction and the front-back direction coincide with the z-axis direction and the x-axis direction, respectively. On the other hand, in the first section A2 (for example, at the position of (2)) in which the multilayer body 12 is bent, the up-down direction does not coincide with the z-axis direction and the front-back direction does not coincide with the z-axis direction the x-axis direction.

As illustrated in FIG. 7, the electronic device 1 incudes the transmission line 10, connectors 32*a*, 32*b*, 102*a*, and 102*b*, and circuit boards 100 and 110.

The circuit boards 100 and 110 each have a plate shape. The circuit board 100 includes main surfaces S5 and S6. The main surface S5 extends farther on the negative direction side of the z-axis than the main surface S6. The circuit board 110 includes main surfaces S11 and S12. The main surface S11 extends farther on the negative direction side of the z-axis than the main surface S12. The circuit boards 100 and 110 include a wiring conductor layer, a ground conductor layer, an electrode, and the like that are not illustrated.

The connectors 32*a* and 32*b* are mounted at the main surface (upper main surface) on the positive direction side of the z-axis in the second section A1 and the second section A3, respectively. More precisely, the connector 32*a* is mounted on the signal terminal 28*a* and the first ground conductor layer 24. The connector 32*b* is mounted on the signal terminal 28*b* and the first ground conductor layer 24.

The connectors 102*a* and 102*b* are mounted on the main surface S5 of the circuit board 100 and the main surface S11 of the circuit board 110, respectively. The connectors 102*a* and 102*b* are connected to the connectors 32*a* and 32*b*, respectively. As a result, the transmission line 10 electrically connects the circuit board 100 to the circuit board 110.

In the electronic device 1 described above, as illustrated in FIGS. 4 and 6, in the first section A2, the length of the first spacer Pa in the up-down direction is equal to or less than the maximum value hamax of the first hollow portion Ha in the up-down direction. The maximum value hamax is the length in the up-down direction from the upper end to the lower end of the first hollow portion Ha. Similarly, in the first section A2, the length of the second spacer Pb in the up-down direction is equal to or less than the maximum values hbmax of the second hollow portion Hb in the up-down direction. The maximum value hbmax is the length in the up-down direction from the upper end to the lower end of the second hollow portion Hb.

Effects

With the use of the transmission line 10, the transmission line 10 can be easily bent. More precisely, when the transmission line 10 is bent, the first hollow portion Ha is deformed. Therefore, in order to cause the transmission line 10 to be easily bent, the first hollow portion Ha should be easily deformed. Therefore, in the transmission line 10, the length h1 of the first hollow portion Ha in the up-down direction in the first overlapping region A11 is shorter than the length h2 of the first hollow portion Ha in the up-down direction in the first non-overlapping region A12. In this case, the lower end of the first spacer Pa is not in contact with the lower surface SDa of the first hollow portion Ha. Therefore, when the transmission line 10 is bent with a large curvature radius, the lower end of the first spacer Pa is less likely to come into contact with the lower surface SDa of the first hollow portion Ha. Therefore, the first spacer Pa is less likely to hinder the deformation of the first hollow portion Ha. Note that for the same reason as the first spacer Pa, the second spacer Pb is also less likely to hinder the deformation of the second hollow portion Hb. That is, bending of the transmission line 10 is less likely to be hindered. From the above, with the use of the transmission line 10, the transmission line 10 can be easily bent.

With the use of the transmission line 10, a change of the characteristic impedance generated in the signal conductor layer 22 from a desired characteristic impedance (for example, 50Ω) is reduced or prevented. More precisely, when the transmission line 10 is bent, if the first hollow portion Ha is largely deformed, the permittivity around the signal conductor layer 22 is largely changed. As a result, the characteristic impedance generated in the signal conductor layer 22 may be largely changed from a desired characteristic impedance.

Therefore, in the transmission line 10, the length h1 of the first hollow portion Ha in the up-down direction in the first overlapping region A11 is shorter than the length h2 of the first hollow portion Ha in the up-down direction in the first non-overlapping region A12. Therefore, when the transmission line 10 is bent with a small curvature radius, the lower end of the first spacer Pa comes into contact with the lower surface SDa of the first hollow portion Ha. As a result, the first spacer Pa functions as a spacer that prevents the first hollow portion Ha from being deformed. As a result, the first hollow portion Ha is less likely to be largely deformed. Note that for the same reason as the first spacer Pa, the second spacer Pb also prevents the second hollow portion Hb from being largely deformed. As a result, a large change of the permittivity around the signal conductor layer 22 is reduced or prevented. The term "largely" here means that the deformation amount in a case where the first spacer Pa does not exist is large compared with the deformation amount in a case where the first spacer Pa exists. The deformation amount refers to the length of the first hollow portion Ha in the up-down direction. From the above, with the use of the transmission line 10, a change of the characteristic impedance generated in the signal conductor layer 22 from a desired characteristic impedance is reduced or prevented.

In the transmission line 10, dielectric loss generated in the signal conductor layer 22 can be reduced. More precisely, the first hollow portion Ha is located above the signal conductor layer 22. The first hollow portion Ha is a hollow. Therefore, the permittivity in the first hollow portion Ha is lower than the permittivity in the insulator layers 16*a* to 16*f*. Similarly, the dielectric loss tangent in the first hollow portion Ha is lower than the dielectric loss tangent in the insulator layers 16*a* to 16*f*. As a result, the permittivity and the dielectric loss tangent around the first hollow portion Ha becomes low. For the same reason, the permittivity and the dielectric loss tangent around the second hollow portion Hb becomes low. As a result, the dielectric loss generated in the signal conductor layer 22 is reduced.

First Preferred Embodiment

Figure 8:
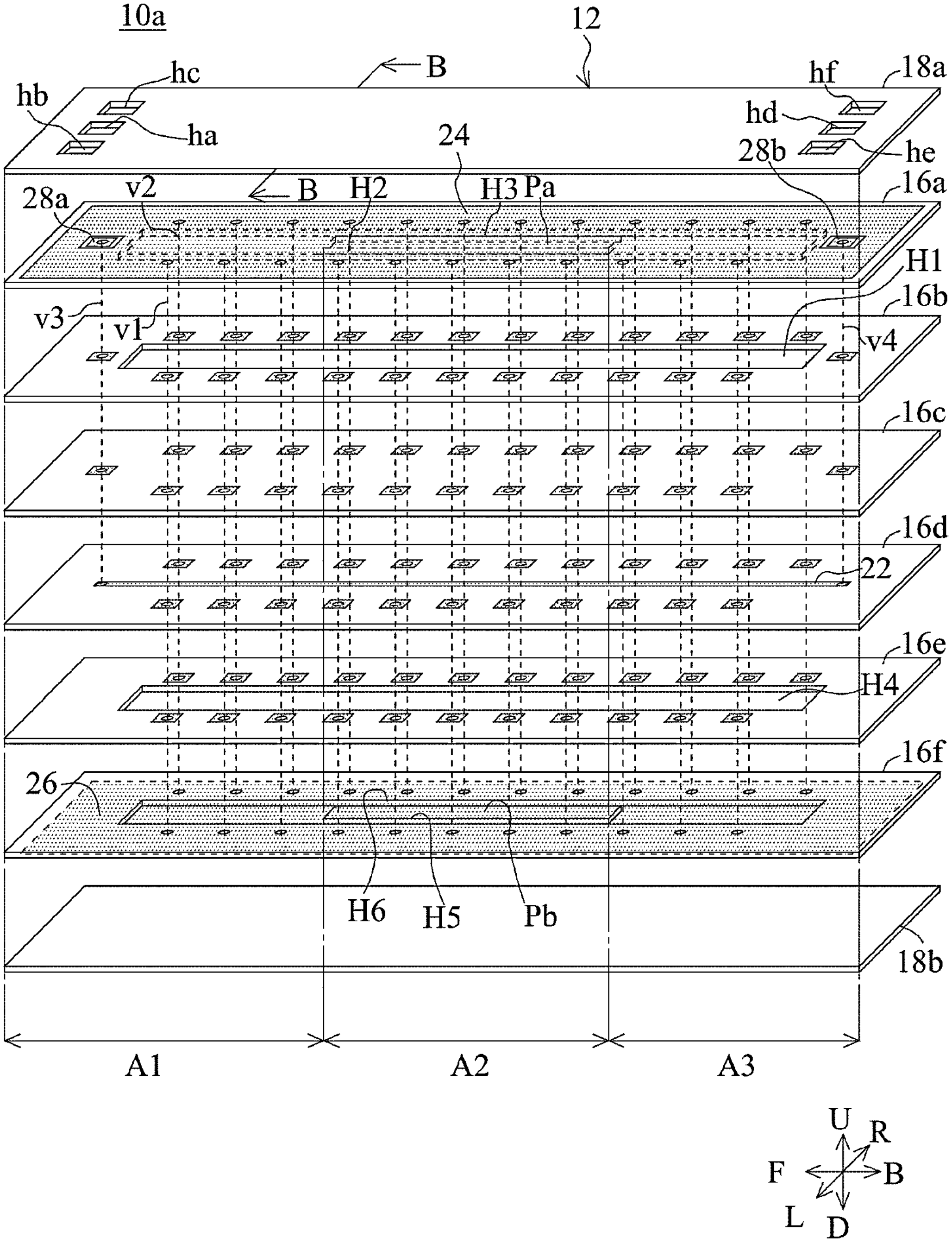
FIG. 8 is an exploded perspective view of a transmission line 10*a*.
Figure 9:
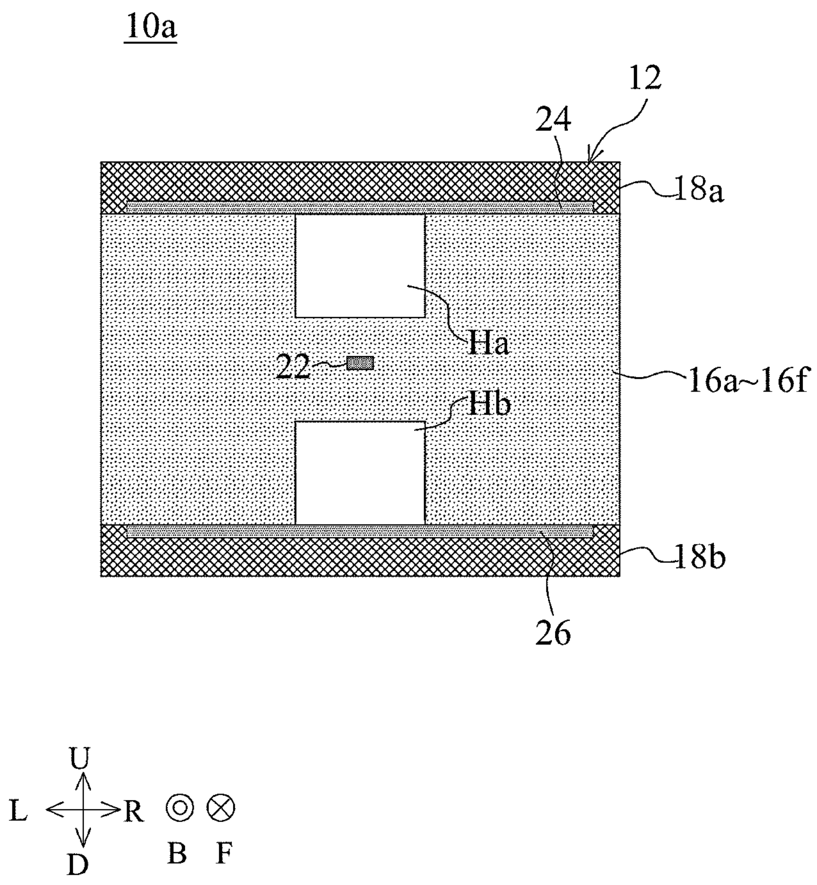
FIG. 9 is a cross-sectional view cut along line B-B of FIG. 8.

Next, a transmission line 10*a* according to a first modification of a preferred embodiment of the present invention will be described with reference to the drawings. FIG. 8 is an exploded perspective view of the transmission line 10*a*. FIG. 9 is a cross-sectional view cut along line B-B of FIG. 8.

The transmission line 10*a* is different from the transmission line 10 in that the cross-sectional structure of the first section A2 is different from the cross-sectional structure of the second sections A1 and A3. More precisely, in the first section A2, the transmission line 10*a* has the cross-sectional structure of FIG. 2. Therefore, in the first section A2, the first spacer Pa and the second spacer Pb are provided in the multilayer body 12. On the other hand, in the second sections A1 and A3, the transmission line 10*a* has the cross-sectional structure of FIG. 9. Therefore, in the second sections A1 and A3, the first spacer Pa and the second spacer Pb are not provided in the multilayer body 12. Other configurations of the transmission line 10*a* are the same as those of the transmission line 10, and thus the description will be omitted.

The transmission line 10*a* exhibits the same effects as the transmission line 10. In addition, the transmission line 10*a* can further reduce the dielectric loss generated in the signal conductor layer 22. More precisely, the transmission line 10*a* is not bent in the second section A1 or A3. Therefore, the first spacer Pa and the second spacer Pb do not have to be provided in the multilayer body 12 in the second section A1 or A3. As a result, in the second sections A1 and A3, the volume of the first hollow portion Ha and the volume of the second hollow portion Hb become large. For this reason, in the second sections A1 and A3, the permittivity and the dielectric loss tangent around the signal conductor layer 22 becomes low. As a result, in the second sections A1 and A3, the dielectric loss generated in the signal conductor layer 22 is reduced.

Second Modification

Figure 10:
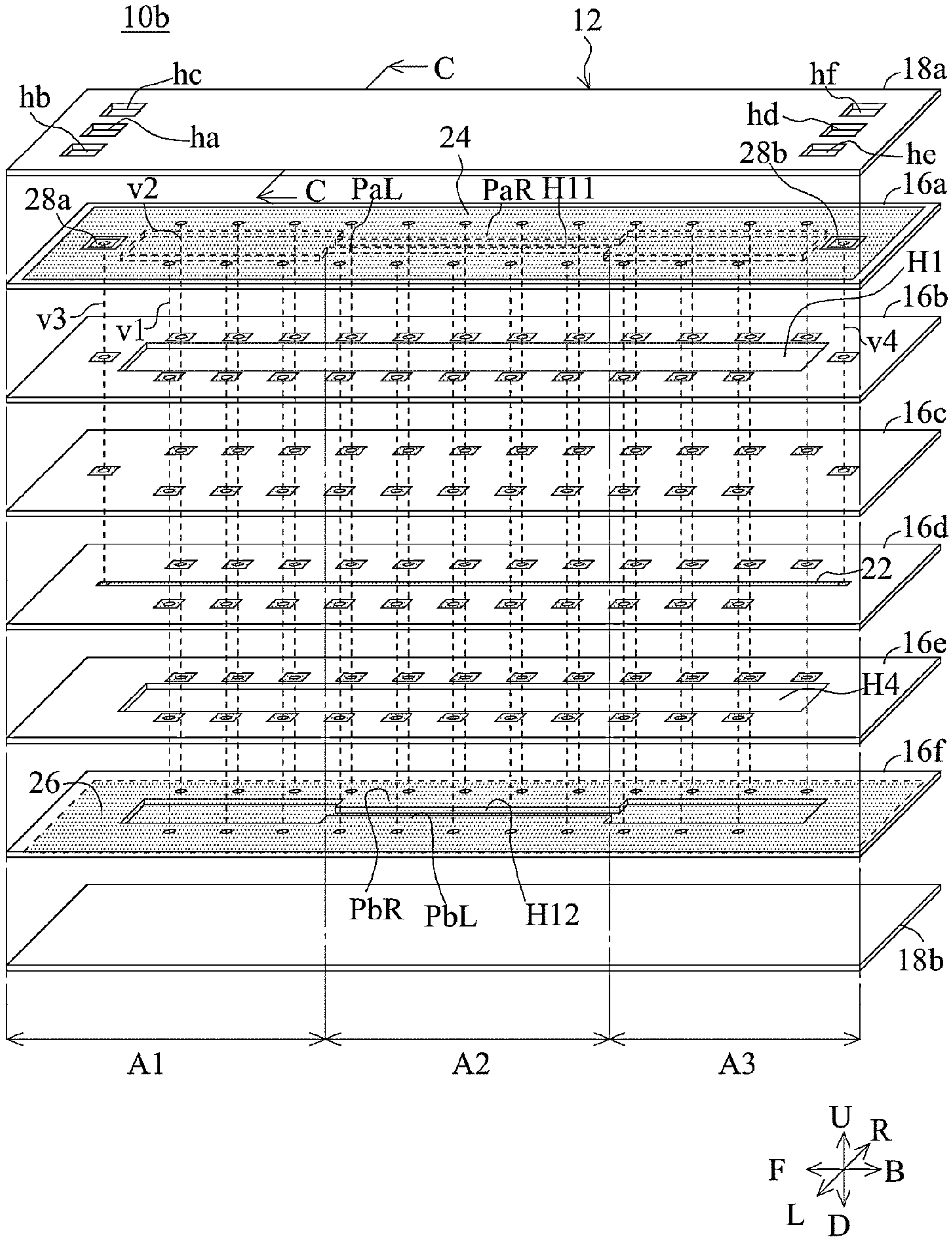
FIG. 10 is an exploded perspective view of a transmission line 10*b*.
Figure 11:
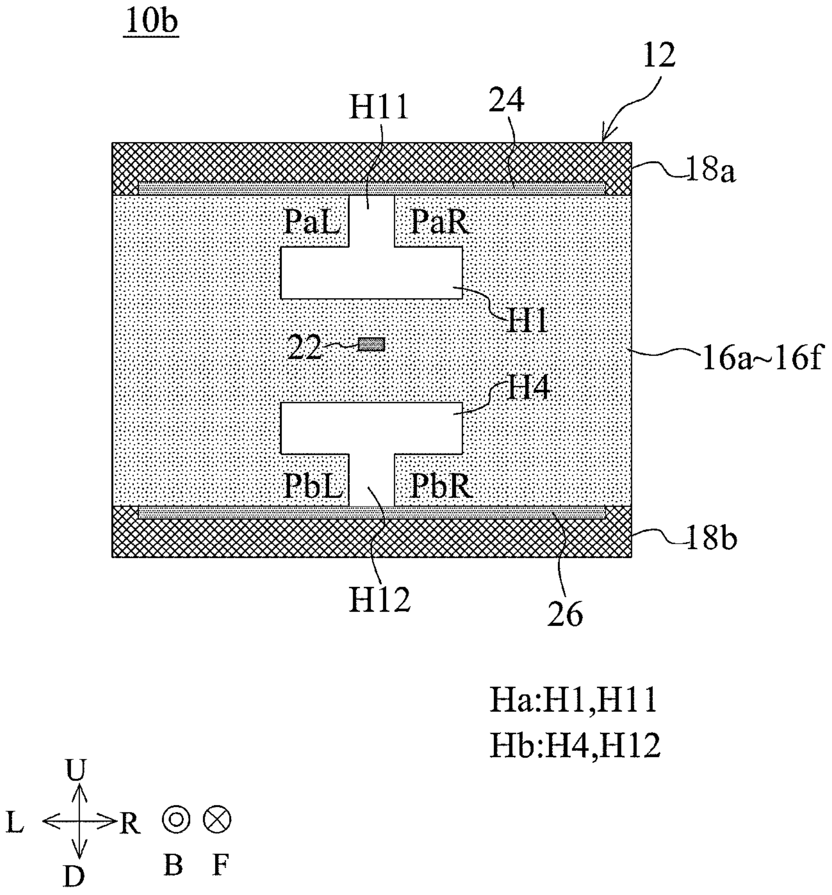
FIG. 11 is a cross-sectional view cut along line C-C of FIG. 10.

Next, a transmission line 10*b* according to a second modification of a preferred embodiment of the present invention will be described with reference to the drawings. FIG. 10 is an exploded perspective view of the transmission line 10*b*. FIG. 11 is a cross-sectional view cut along line C-C of FIG. 10.

The transmission line 10*b* is different from the transmission line 10*a* in the structures of the first spacer Pa and the second spacer Pb. More precisely, in the first section A2, the transmission line 10*b* has the cross-sectional structure of FIG. 11. In the first section A2, first spacers PaL and PaR, and second spacers PbL and PbR are provided in the multilayer body 12. The first spacer PaL is provided on the upper left of the first hollow portion Ha. Therefore, in the cross section orthogonal to the front-back direction, the first hollow portion Ha exists on the right side of the first spacer PaL. The first spacer PaR is provided on the upper right of the first hollow portion Ha. Therefore, in the cross section orthogonal to the front-back direction, the first hollow portion Ha exists on the left side of the first spacer PaR. The second spacer PbL is provided on the lower left of the second hollow portion Hb. Therefore, in the cross section orthogonal to the front-back direction, the second hollow portion Hb exists on the right side of the second spacer PbR. The second spacer PbL is provided on the lower right of the second hollow portion Hb. Therefore, in the cross section orthogonal to the front-back direction, the second hollow portion Hb exists on the left side of the second spacer PbR. Other configurations of the transmission line 10*b* are the same as those of the transmission line 10*a*, and thus the description will be omitted. With the use of the transmission line 10*b*, the same effects as the transmission line 10*a* are exhibited.

Third Modification

Figure 12:
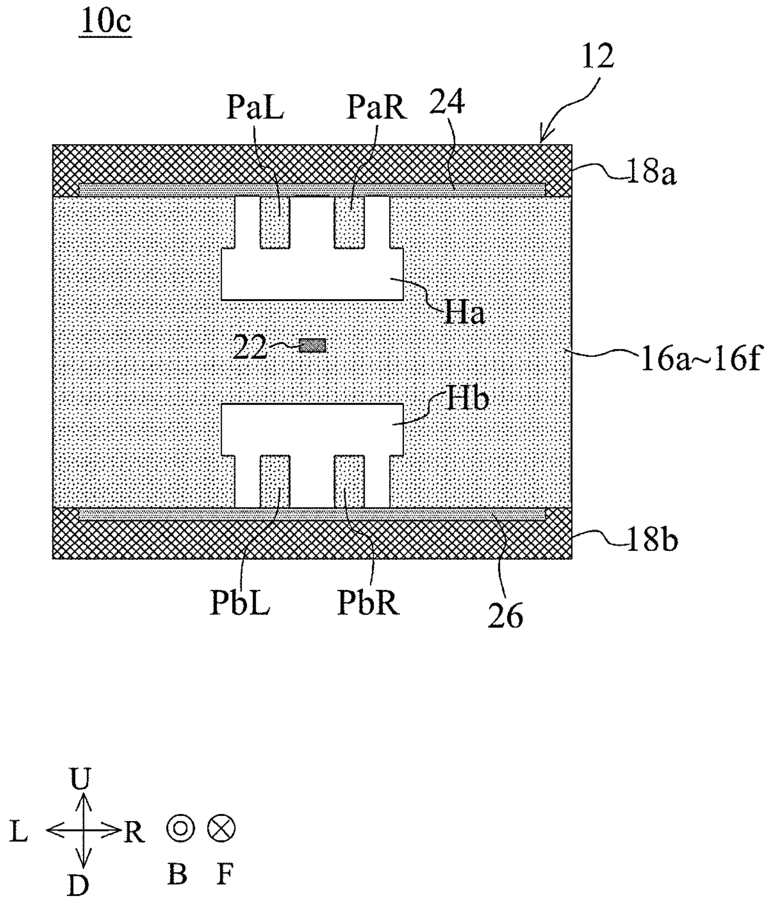
FIG. 12 is a cross-sectional view of a transmission line 10*c*.

Next, a transmission line 10*c* according to a third modification of a preferred embodiment of the present invention will be described with reference to the drawings. FIG. 12 is a cross-sectional view of the transmission line 10*c*.

The transmission line 10*c* is different from the transmission line 10*b* in the structures of the first spacers PaL and PaR and the second spacers PbL and PbR. More precisely, in the cross section orthogonal to the front-back direction, the first hollow portion Ha exists on the left and right sides of the first spacer PaL. In the cross section orthogonal to the front-back direction, the first hollow portion Ha exists on the left and right sides of the first spacer PaR. In the cross section orthogonal to the front-back direction, the second hollow portion Hb exists on the left and right sides of the second spacer PbL. In the cross section orthogonal to the front-back direction, the second hollow portion Hb exists on the left and right sides of the second spacer PbR. Other configurations of the transmission line 10*c* are the same as those of the transmission line 10*b*, and thus the description will be omitted. With the use of the transmission line 10*c*, the same effects as the transmission line 10*b* are exhibited.

Fourth Modification

Figure 13:
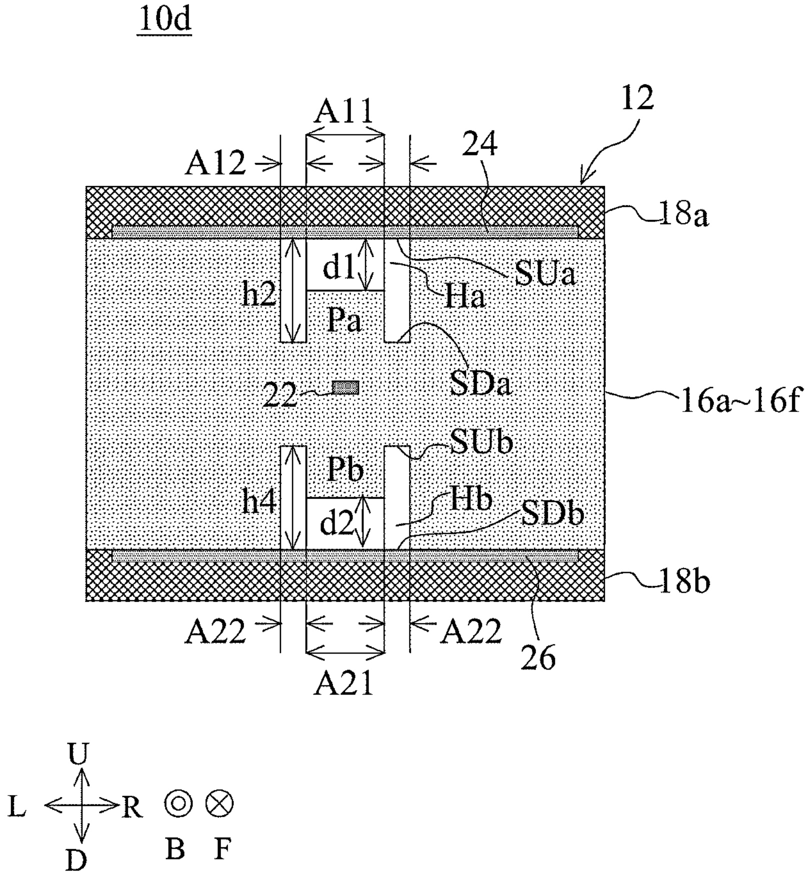
FIG. 13 is a cross-sectional view of a transmission line 10*d*.

Next, a transmission line 10*d* according to a fourth modification of a preferred embodiment of the present invention will be described with reference to the drawings. FIG. 13 is a cross-sectional view of the transmission line 10*d*.

The transmission line 10*d* is different from the transmission line 10*a* in the structures of the first spacer Pa and the second spacer Pb. The first spacer Pa projects upward from the lower surface SDa of the first hollow portion Ha. The length d1 from the upper end of the first spacer Pa to the upper surface SUa of the first hollow portion Ha in the up-down direction is shorter than the length h2 of the first hollow portion Ha in the up-down direction in the first non-overlapping region A12. Since the second spacer Pb has a structure symmetrical in the up-down direction to the first spacer Pa, the description will be omitted. Other configurations of the transmission line 10*d* are the same as those of the transmission line 10*a*, and thus the description will be omitted. With the use of the transmission line 10*d*, the same effects as the transmission line 10*a* are exhibited.

Fifth Modification

Figure 14:
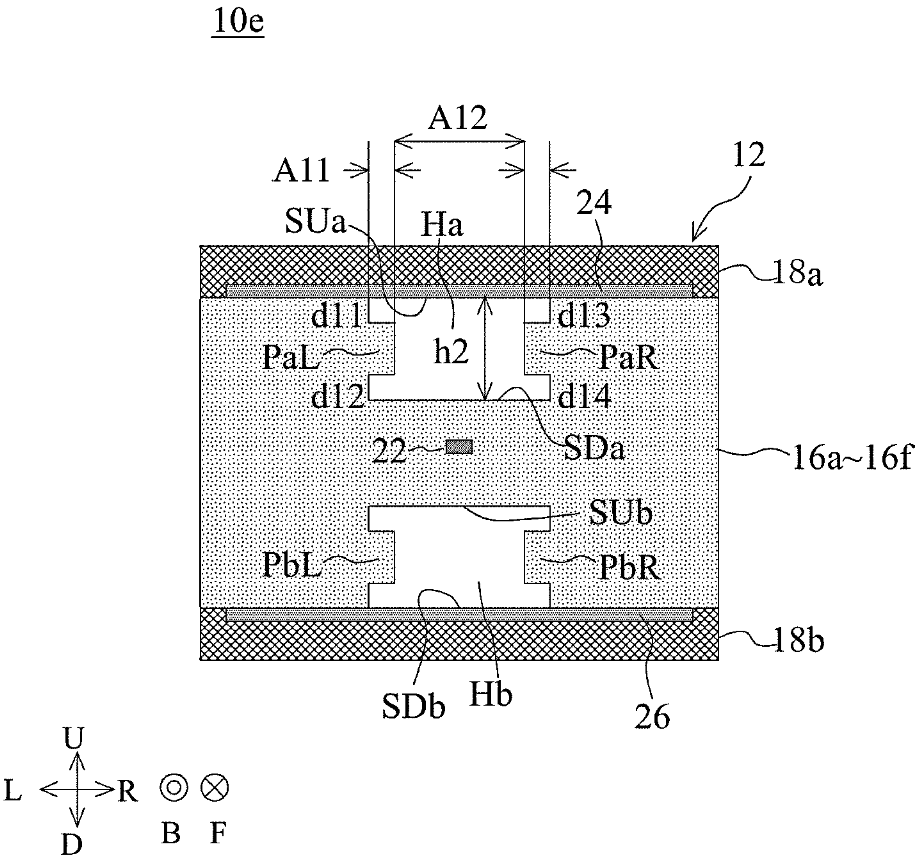
FIG. 14 is a cross-sectional view of a transmission line 10*e*.

Next, a transmission line 10*e* according to a fifth modification of a preferred embodiment of the present invention will be described with reference to the drawings. FIG. 14 is a cross-sectional view of the transmission line 10*e*.

The transmission line 10*e* is different from the transmission line 10*b* in the structures of the first spacers PaL and PaR and the second spacers PbL and PbR. More precisely, the first spacer PaL is located on the left surface of first hollow portion Ha. In addition, the first spacer PaL projects in the right direction on the left surface of the first hollow portion Ha. The first spacer PaR is located on the right surface of the first hollow portion Ha. In addition, the first spacer PaR projects in the left direction on the right surface of the first hollow portion Ha. In the cross section orthogonal to the front-back direction, the first hollow portion Ha exists above the first spacers PaL and PaR and below the first spacers PaL and PaR. As a result, the sum of a length d11 from the upper surface of the first spacer PaL to the upper surface SUa of the first hollow portion Ha in the up-down direction and a length d12 from the lower surface of the first spacer PaL to the lower surface SDa of the first hollow portion Ha in the up-down direction is shorter than the length h2 of the first hollow portion Ha in the up-down direction in the first non-overlapping region A12. As a result, the length of the first hollow portion Ha in the up-down direction in the first overlapping region A11 is shorter than the length of the first hollow portion Ha in the up-down direction in the first non-overlapping region A12. The sum of a length d13 from the upper surface of the first spacer PaR to the upper surface SUa of the first hollow portion Ha in the up-down direction and a length d14 from the lower surface of the first spacer PaR to the lower surface SDa of the first hollow portion Ha in the up-down direction is shorter than the length h2 of the first hollow portion Ha in the up-down direction in the first non-overlapping region A12. As a result, the length of the second hollow portion Hb in the up-down direction in the second overlapping region A21 is shorter than the length of the second hollow portion Hb in the up-down direction in the second non-overlapping region A22.

Note that the second spacers PbL and PbR have structures symmetrical in the up-down direction to the first spacers PaL and PaR, respectively, and thus the description will be omitted. In addition, other configurations of the transmission line 10*e* are the same as those of the transmission line 10*b*, and thus the description will be omitted. The transmission line 10*e* will exhibit the same effects as the transmission line 10*b*.

Sixth Preferred Embodiment

Figure 15:
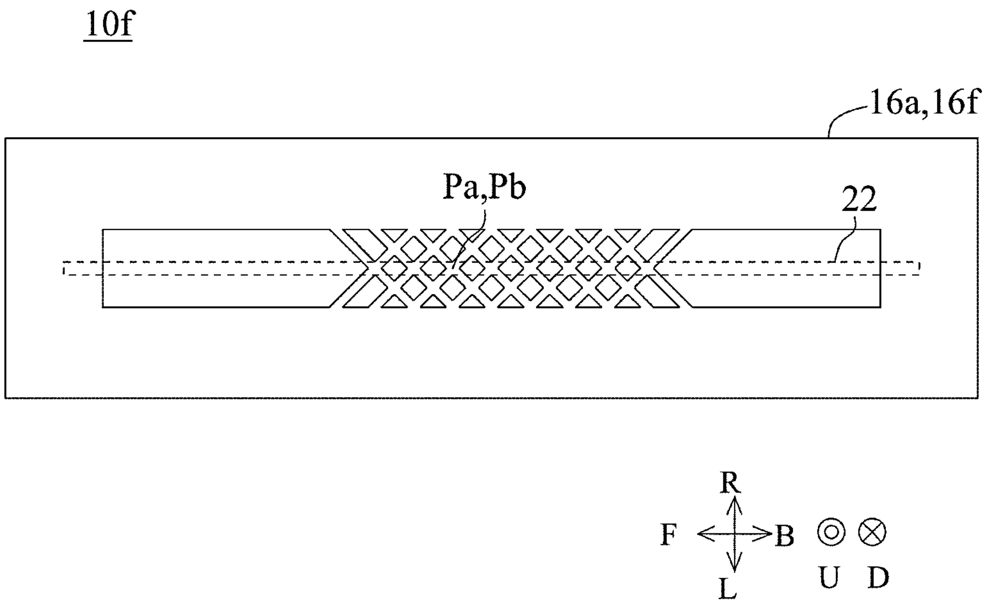
FIG. 15 is a top view of insulator layers 16*a* and 16*f* of a transmission line 10*f*.

Next, a transmission line 10*f* according to a sixth modification of a preferred embodiment of the present invention will be described with reference to the drawings. FIG. 15 is a top view of the insulator layers 16*a* and 16*f* of the transmission line 10*f*. In FIG. 15, the conductor layers are omitted.

The transmission line 10*f* is different from the transmission line 10*b* in the structures of the insulator layers 16*a* and 16*f*. More precisely, the insulator layer 16*a* has a mesh shape in the first section A2 when viewed in the up-down direction. As a result, the first spacer Pa has a mesh shape when viewed in the up-down direction. Similarly, the insulator layer 16*f* has a mesh shape in the first section A2 when viewed in the up-down direction. As a result, the second spacer Pb has a mesh shape when viewed in the up-down direction. Other configurations of the transmission line 10*f* are the same as those of the transmission line 10*b*, and thus the description will be omitted. The transmission line 10*f* exhibits the same effects as the transmission line 10*b*.

Seventh Modification

Figure 16:
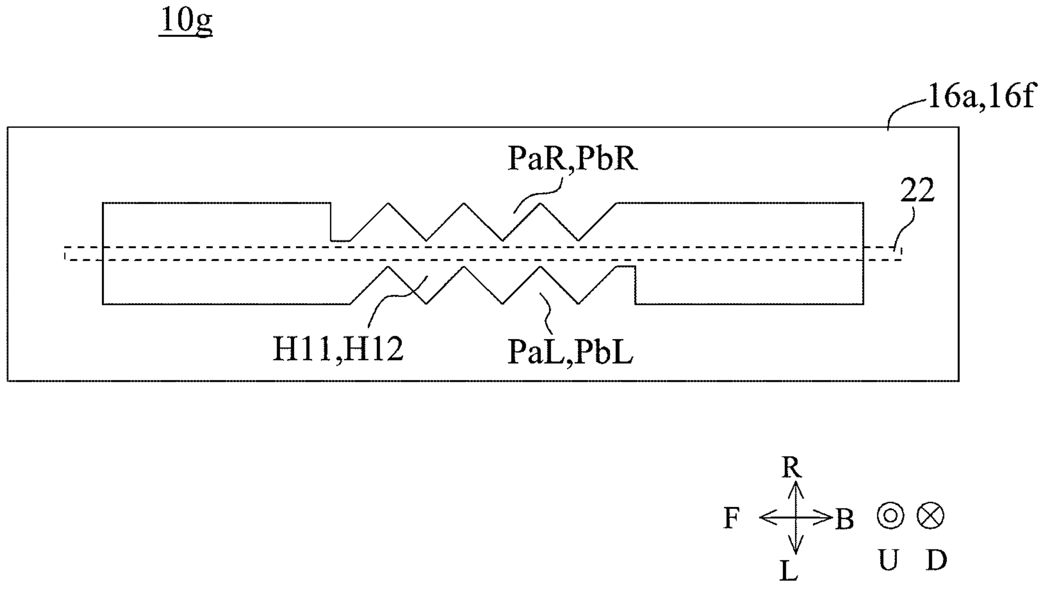
FIG. 16 is a top view of the insulator layers 16*a* and 16*f* of a transmission line 10*g*.

Next, a transmission line 10*g* according to a seventh modification of a preferred embodiment of the present invention will be described with reference to the drawings. FIG. 16 is a top view of the insulator layers 16*a* and 16*f* of the transmission line 10*g*. In FIG. 16, the conductor layers are omitted.

The transmission line 10*g* is different from the transmission line 10*b* in the structures of the insulator layers 16*a* and 16*f*. More precisely, the shapes of the first spacers PaL and PaR in the cross section orthogonal to the front-back direction periodically change in the front-back direction. More precisely, the widths of the first spacers PaL and PaR in the left-right direction repeat increasing and decreasing in the front-back direction. As a result, the shape of a through hole H11 has a zigzag shape when viewed in the up-down direction. Note that the second spacers PbL and PbR have structures symmetrical in the up-down direction to the first spacers PaL and PaR, respectively, and thus the description will be omitted. Other configurations of the transmission line 10*g* are the same as those of the transmission line 10*b*, and thus the description will be omitted. The transmission line 10*g* exhibits the same effects as the transmission line 10*b*.

Eighth Modification

Figure 17:
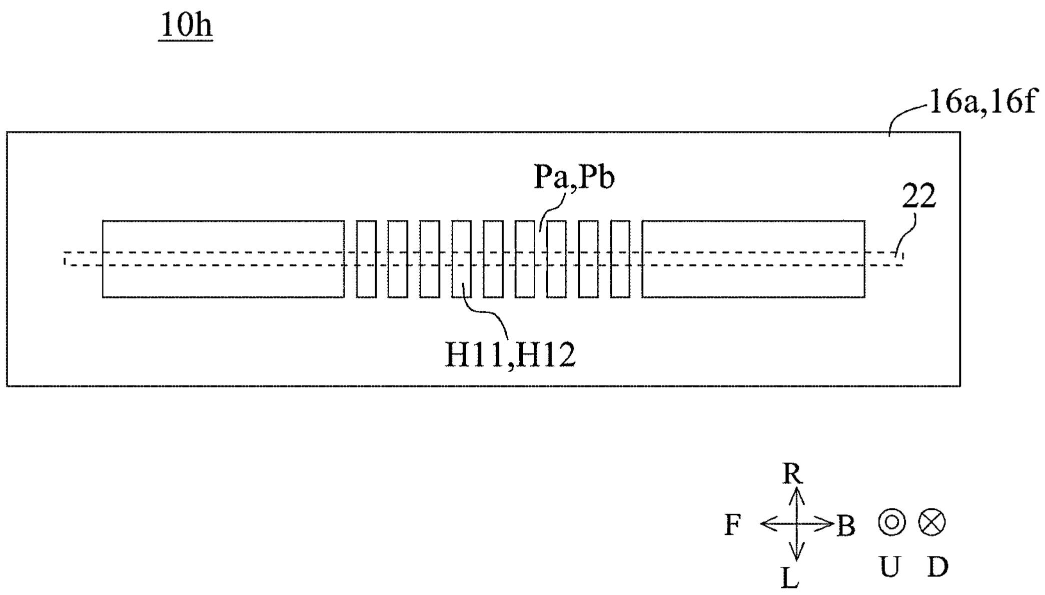
FIG. 17 is a top view of the insulator layers 16*a* and 16*f* of a transmission line 10*h*.

Next, a transmission line 10*h* according to an eighth modification of a preferred embodiment of the present invention will be described with reference to the drawings. FIG. 17 is a top view of the insulator layers 16*a* and 16*f* of the transmission line 10*h*. In FIG. 17, the conductor layers are omitted.

The transmission line 10*h* is different from the transmission line 10*b* in the structures of the insulator layers 16*a* and 16*f*. More precisely, a plurality of through holes H11 is provided in the insulator layer 16*a*. The plurality of through holes H11 is arranged in a line in the front-back direction. In addition, the first spacer Pa is located between two through holes H11 adjacent to each other. As a result, the plurality of through holes H11 and a plurality of first spacers Pa are alternatively arranged in the front-back direction.

Here, in the transmission line 10*h*, the cross section for defining the first overlapping region A11 is a cross section that passes through a first spacer Pa and does not pass through a through hole H11 at the same time. The cross section for defining the first non-overlapping region A12 is a cross section that does not pass through a first spacer Pa and passes through a through hole H11. As described above, the cross section for defining the first overlapping region A11 does not have to coincide with the cross section for defining the first non-overlapping region A12.

Note that the second spacer Pb has a structure symmetrical in the up-down direction to each first spacer Pa, and thus the description will be omitted. Other configurations of the transmission line 10*h* are the same as those of the transmission line 10*b*, and thus the description will be omitted. The transmission line 10*h* exhibits the same effects as the transmission line 10*b*.

Ninth Modification

Figure 18:
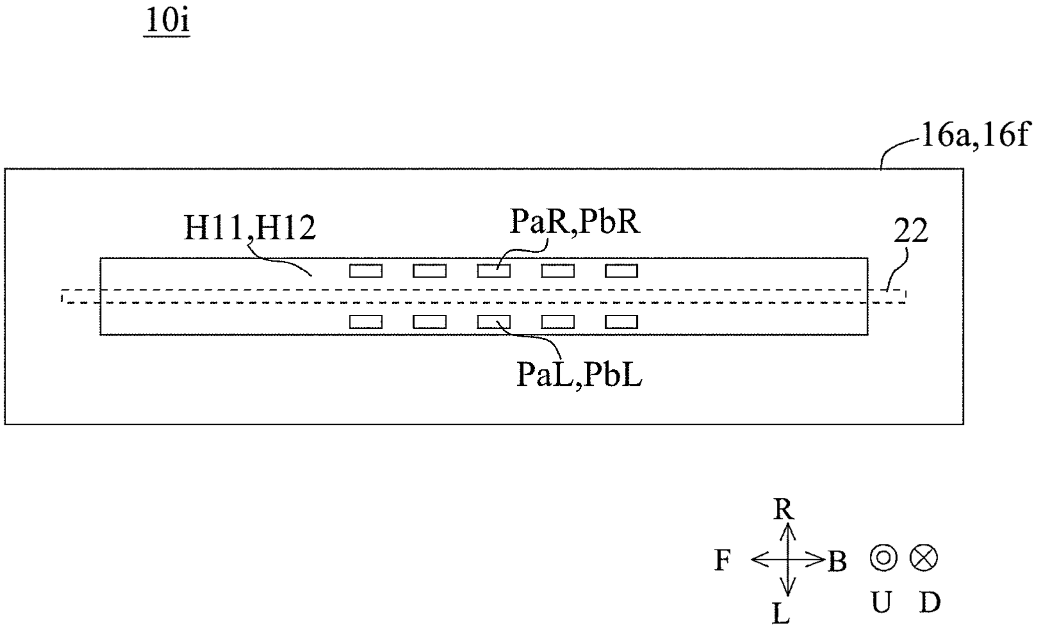
FIG. 18 is a top view of the insulator layers 16*a* and 16*f* of a transmission line 10*i*.

Next, a transmission line 10*i* according to a ninth modification of a preferred embodiment of the present invention will be described with reference to the drawings. FIG. 18 is a top view of the insulator layers 16*a* and 16*f* of the transmission line 10*i*. In FIG. 18, the conductor layers are omitted.

The transmission line 10*i* is different from the transmission line 10*b* in the structures of the insulator layers 16*a* and 16*f*. More precisely, in the transmission line 10*i*, pluralities of the first spacers PaL and PaR are provided in the through hole H11 provided in the insulator layer 16*a*. The pluralities of first spacers PaL and PaR each has a rectangular or substantially rectangular shape when viewed in the up-down direction. In addition, the plurality of first spacers PaL is arranged in a line in the front-back direction in the left portion of the through hole H11. The plurality of first spacers PaR is arranged in a line in the front-back direction in the right portion of the through hole H11. Each of the plurality of first spacers PaR overlaps a corresponding one of the plurality of first spacers PaL when viewed in the left-right direction. The pluralities of first spacers PaL and PaR described above extend in the up-down direction. In addition, in the directions orthogonal to the up-down direction, the first hollow portion Ha exists around the pluralities of first spacers PaL and PaR.

Note that the second spacers PbL and PbR have structures symmetrical in the up-down direction to the first spacers PaL and PaR, respectively, and thus the description will be omitted. Other configurations of the transmission line 10*i* are the same as those of the transmission line 10*b*, and thus the description will be omitted. The transmission line 10*i* exhibits the same effects as the transmission line 10*b*.

Tenth Modification

Figure 19:
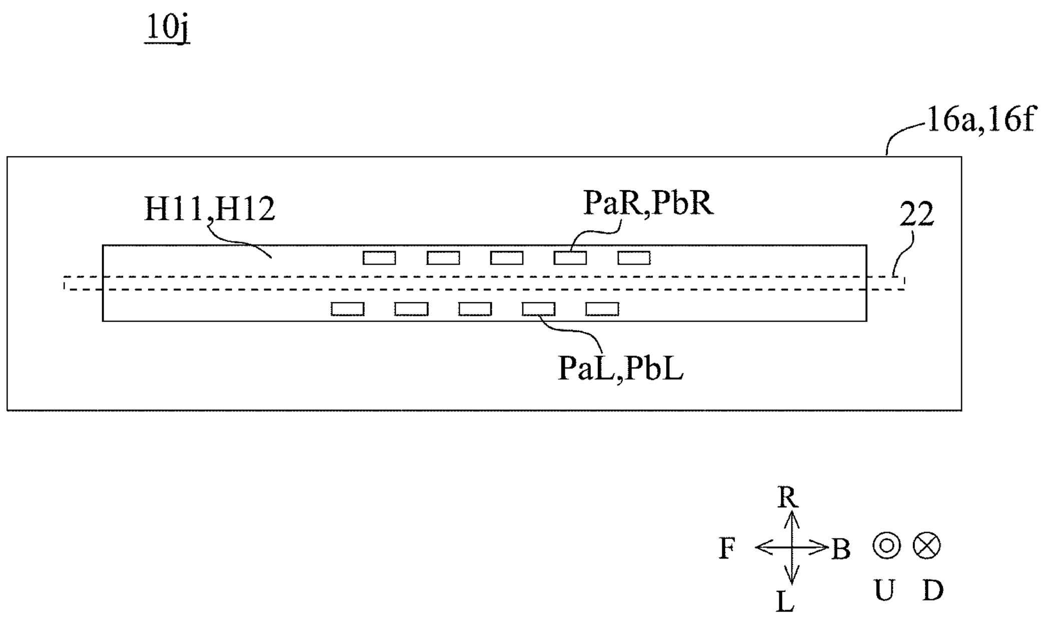
FIG. 19 is a top view of the insulator layers 16*a* and 16*f* of a transmission line 10*j*.

Next, a transmission line 10*j* according to a tenth modification of a preferred embodiment of the present invention will be described with reference to the drawings. FIG. 19 is a top view of the insulator layers 16*a* and 16*f* of the transmission line 10*j*. In FIG. 19, the conductor insulators are omitted.

The transmission line 10*j* is different from the transmission line 10*i* in the structures of the insulator layers 16*a* and 16*f*. More precisely, in the transmission line 10*i*, each of the plurality of first spacers PaR overlaps a corresponding one of the plurality of first spacers PaL when viewed in the left-right direction. On the other hand, in the transmission line 10*j*, each of the plurality of first spacers PaR does not overlap the plurality of first spacers PaL when viewed in the left-right direction. Each of the plurality of first spacers PaR is located between the plurality of first spacers PaL when viewed in the left-right direction.

Note that the second spacers PbL and PbR have structures symmetrical in the up-down direction to the first spacers PaL and PaR, respectively, and thus the description will be omitted. Other configurations of the transmission line 10*j* are the same as those of the transmission line 10*i*, and thus the description will be omitted. The transmission line 10*j* exhibits the same effects as the transmission line 10*i*.

Eleventh Modification

Figure 20:
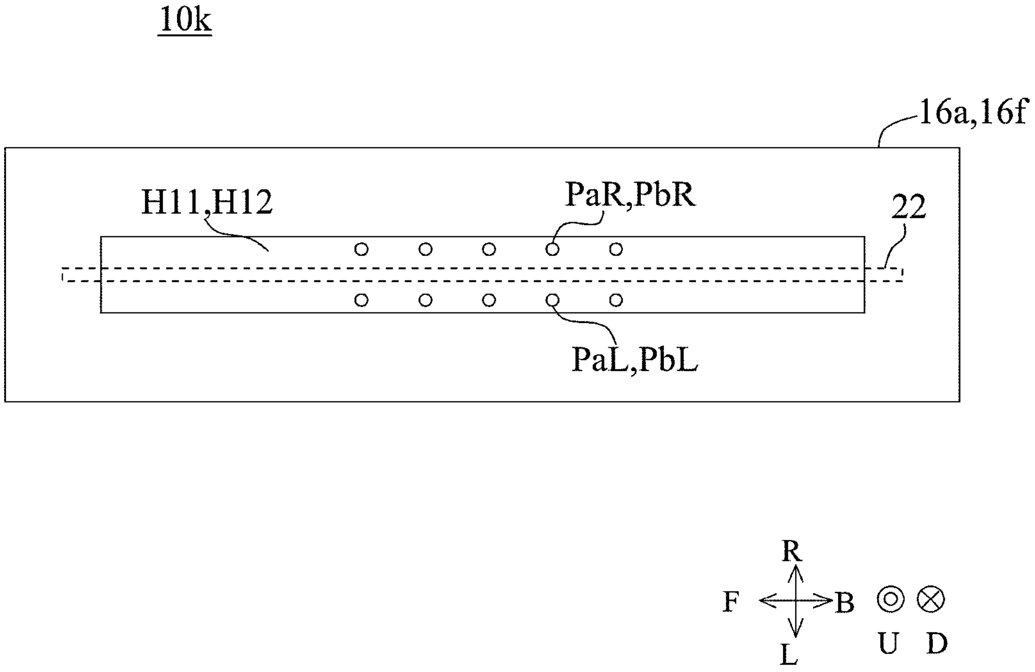
FIG. 20 is a top view of the insulator layers 16*a* and 16*f* of a transmission line 10*k*.

Next, a transmission line 10*k* according to an eleventh modification of a preferred embodiment of the present invention will be described with reference to the drawings. FIG. 20 is a top view of the insulator layers 16*a* and 16*f* of the transmission line 10*k*. In FIG. 20, the conductor insulators are omitted.

The transmission line 10*k* is different from the transmission line 10*i* in the shape of the first spacers PaL and PaR and the shape of the second spacers PbL and PbR. More precisely, the first spacers PaL and PaR each have a circular shape when viewed in the up-down direction. Note that the second spacers PbL and PbR have structures symmetrical in the up-down direction to the first spacers PaL and PaR, respectively, and thus the description will be omitted. Other configurations of the transmission line 10*k* are the same as those of the transmission line 10*i*, and thus the description will be omitted. The transmission line 10*k* exhibits the same effects as the transmission line 10*i*.

Twelfth Modification

Figure 21:
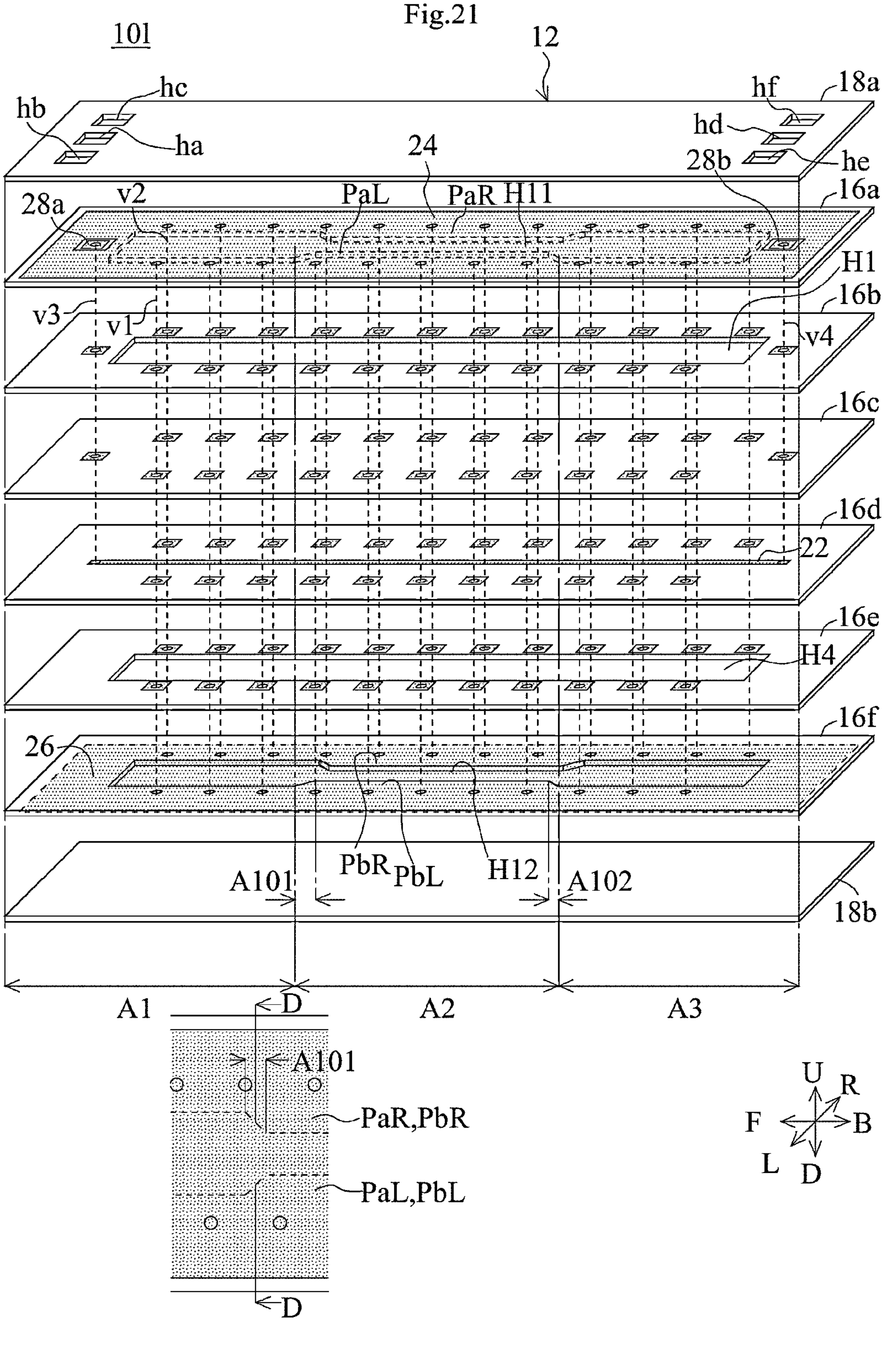
FIG. 21 is an exploded perspective view of a transmission line 10*l*.
Figure 22:
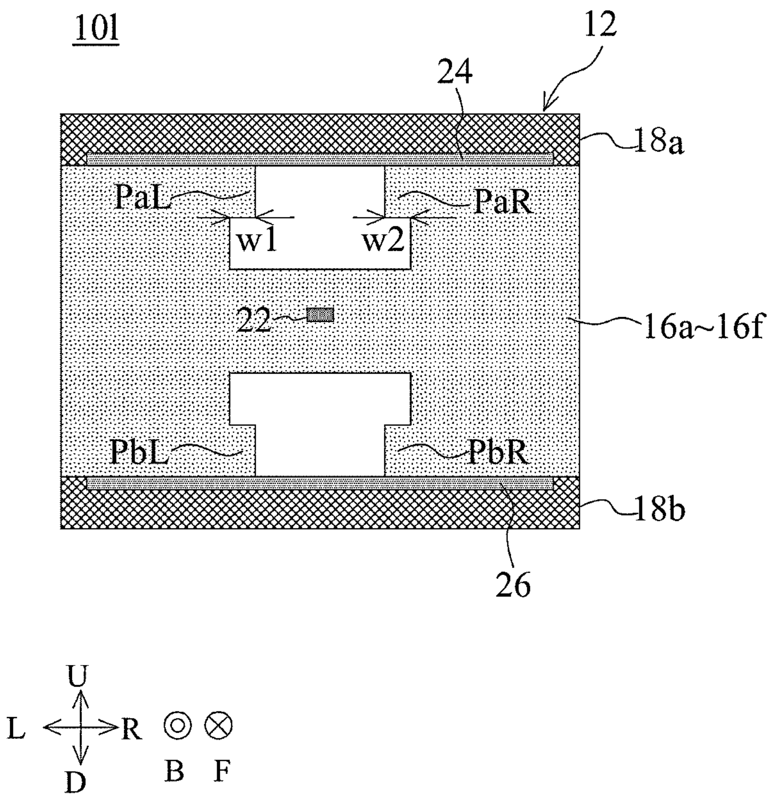
FIG. 22 is a cross-sectional view cut along line D-D of FIG. 21.

Next, a transmission line 10*l* according to a twelfth modification of a preferred embodiment of the present invention will be described with reference to the drawings. FIG. 21 is an exploded perspective view of the transmission line 10*l*. FIG. 22 is a cross-sectional view cut along line D-D of FIG. 21.

The transmission line 10*l* is different from the transmission line 10*b* in the shape of the first spacers PaL and PaR and the shape of the second spacers PbL and PbR. More precisely, the transmission line 10*l* has a section A101 in which widths w1 and w2 of the first spacers PaL and PaR in the left-right direction in the cross section orthogonal to the front-back direction increase toward the front direction, and a section A102 in which the widths w1 and w2 of the first spacers PaL and PaR in the left-right direction in the cross section orthogonal to the front-back direction decrease toward the front direction. The sections A101 and A102 are located in the first section A2. The section A101 is in contact with the second section A1. The section A102 is in contact with the second section A3.

Note that the second spacers PbL and PbR have structures symmetrical in the up-down direction to the first spacers PaL and PaR, respectively, and thus the description will be omitted. Other configurations of the transmission line 10*l* are the same as those of the transmission line 10*b*, and thus the description will be omitted. The transmission line 10*l* exhibits the same effects as the transmission line 10*b*. In addition, in the transmission line 10*l*, the widths w1 and w2 of the first spacers PaL and PaR in the left and right direction continuously change. As a result, the characteristic impedance generated in the signal conductor layer 22 continuously changes in the sections A101 and A102. As a result, a high frequency signal is less likely to reflect at the boundary between the first section A2 and the second section A1 and at the boundary between the first section A2 and the second section A3.

OTHER MODIFICATIONS

The transmission lines according to preferred embodiments of the present invention are not limited to the transmission lines 10, and 10*a* to 101 and can be modified within the scope of the gist of the present invention. Note that the configurations of the transmission lines 10, and 10*a* to 101 may be appropriately combined.

Note that the transmission lines 10, and 10*a* to 101 may include a plurality of signal conductor layers. In this case, the plurality of signal conductor layers may define, for example, a differential transmission line. In addition, the plurality of signal conductor layers does not have to be provided on the same insulator layer.

Note that in the transmission lines 10, and 10*a* to 101, the signal terminals 28*a* and 28*b* may be provided on the lower main surface of the multilayer body 12.

Note that the transmission lines 10, and 10*a* to 101 may further include other circuits in addition to the strip lines.

Note that on the transmission lines 10, and 10*a* to 101, an electronic component other than the connectors 32*a* and 32*b* may be mounted. The electronic component is, for example, a chip inductor, a chip capacitor, and the like.

Note that in the transmission lines 10, and 10*a* to 101, the second ground conductor layer 26 is not a necessary constituent. In this case, the signal conductor layer 22 and the first ground conductor layer 24 configure a microstrip line structure.

Note that in the transmission lines 10, and 10*a* to 101, the material of one or more insulator layers of the plurality of insulator layers 16*a* to 16*f* may be a porous material.

Note that in the transmission line 10 and 10*a* to 101, the first hollow portion Ha does not have to overlap the signal conductor layer 22 when viewed in the up-down direction, but the first hollow portion Ha preferably overlaps the signal conductor layer 22 in view of the signal characteristics.

Note that in the transmission line 10*e*, only either one of a first hollow portion HaL and a first hollow portion HaR may be provided. Similarly, only either one of a second hollow portion HbL and a second hollow portion HbR may be provided.

Note that in the transmission line 10*e*, only either one of the first spacer PaL and the first spacer PaR may be provided. Similarly, only either one of the second spacer PbL and the second spacer PbR may be provided.

Note that the transmission line 10*l* may include only either one of the section A101 and the section A102.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transmission line comprising:

a multilayer body with a structure in which a plurality of insulator layers are laminated in an up-down direction where an up direction is a first direction and a down direction is a second direction;

a signal conductor layer in the multilayer body and extending in a front-back direction orthogonal to the up-down direction; and a first ground conductor layer in the multilayer body above the signal conductor layer in the first direction and extending in the front-back direction to overlap the signal conductor layer when viewed in the up-down direction; wherein the multilayer body includes a first hollow portion;

the first hollow portion is above the signal conductor layer in the first direction and below the first ground conductor layer in the second direction;

the first hollow portion overlaps the first ground conductor layer when viewed in the up-down direction;

the multilayer body includes a first spacer that faces the first hollow portion;

in a cross section orthogonal to the front-back direction, a first overlapping region is a region in the first hollow portion in which the first hollow portion overlaps the first spacer in the up-down direction;

in a cross section orthogonal to the front-back direction, a first non-overlapping region is a region in the first hollow portion in which the first hollow portion does not overlap the first spacer in the up-down direction; and a length of the first hollow portion in the up-down direction in the first overlapping region is shorter than a length of the first hollow portion in the up-down direction in the first non-overlapping region.

2. The transmission line according to claim 1, wherein the first spacer projects in the second direction from a first surface of the first hollow portion; and a length in the up-down direction from an end of the first spacer to a second surface of the first hollow portion that is below the first surface of the first hollow portion in the second direction is shorter than the length of the first hollow portion in the up-down direction in the first non-overlapping region.

3. The transmission line according to claim 2, wherein in a cross section orthogonal to the front-back direction, the first hollow portion exists on a left side of the first spacer and a right side of the first spacer.

4. The transmission line according to claim 2, wherein in a cross section orthogonal to the front-back direction, the first hollow portion exists on either one of a left side and a right side of the first spacer.

5. The transmission line according to claim 1, wherein the first spacer projects in the first direction from a second surface of the first hollow portion; and a length in the up-down direction from an end of the first spacer to a first surface of the first hollow portion that is above the second surface of the first hollow portion in the first direction is shorter than the length of the first hollow portion in the up-down direction in the first non-overlapping region.

6. The transmission line according to claim 1, wherein the first spacer is located on a left surface of the first hollow portion or on a right surface of the first hollow portion, the left and right surfaces facing each other in a left-right direction orthogonal to the front-back direction and the up-down direction; and in a cross section orthogonal to the front-back direction, the first hollow portion exists above the first spacer and below the first spacer in the up-down direction.

7. The transmission line according to claim 6, wherein a sum of a length in the up-down direction from an upper surface of the first spacer to an upper surface of the first hollow portion and a length in the up-down direction from a lower surface of the first spacer to a lower surface of the first hollow portion is shorter than the length of the first hollow portion in the up-down direction in the first non-overlapping region.

8. The transmission line according to claim 1, wherein in a cross section orthogonal to the front-back direction, a length of the first spacer in the up-down direction is shorter than a maximum value of a length of the first hollow portion in the up-down direction.

9. The transmission line according to claim 1, wherein a cross-sectional shape of the first spacer is uniform along the front-back direction of a cross section orthogonal to the front-back direction.

10. The transmission line according to claim 1, wherein a shape of the first spacer in a cross section orthogonal to the front-back direction periodically changes in the front-back direction.

11. The transmission line according to claim 1, wherein the first spacer has a mesh shape when viewed in the up-down direction.

12. The transmission line according to claim 1, wherein the first spacer extends in the up-down direction; and in a direction orthogonal to the up-down direction, the first hollow portion exists around the first spacer.

13. The transmission line according to claim 1, wherein the transmission line includes a section in which a width of the first spacer in a left-right direction in a cross section orthogonal to the front-back direction increases along a front direction of the front-back direction, or a section in which the width of the first spacer in the left-right direction in the cross section orthogonal to the front-back direction decreases along the front direction.

14. The transmission line according to claim 1, further comprising:

a second ground conductor layer in the multilayer body below the signal conductor layer in the second direction and extending in the front-back direction to overlap the signal conductor layer when viewed in the up-down direction; wherein the multilayer body includes a second hollow portion;

the second hollow portion is below the signal conductor layer in the second direction and above the second ground conductor layer in the first direction;

the second hollow portion overlaps the second ground conductor layer when viewed in the up-down direction;

the multilayer body includes a second spacer that faces the second hollow portion;

in a cross section orthogonal to the front-back direction, a second overlapping region is a region in the second hollow portion in which the second hollow portion overlaps the second spacer in the up-down direction, and a second non-overlapping region is a region in the second hollow portion in which the second hollow portion does not overlap the second spacer in the up-down direction; and a length of the second hollow portion in the up-down direction in the second overlapping region is shorter than a length of the second hollow portion in the up-down direction in the second non-overlapping region.

15. An electronic device comprising the transmission line according to claim 1.

16. A transmission line comprising:

a multilayer body with a structure in which a plurality of insulator layers are laminated in an up-down direction where an up direction is a first direction and a down direction is a second direction;

a signal conductor layer in the multilayer body and extending in a front-back direction orthogonal to the up-down direction; and a first ground conductor layer in the multilayer body above the signal conductor layer in the first direction and extending in the front-back direction to overlap the signal conductor layer when viewed in the up-down direction; wherein the transmission line includes a first section and a second section;

the first section is bent in the up-down direction with respect to the second section;

the first section has a curvature radius that is smaller than a curvature radius of the second section;

the multilayer body includes a first hollow portion above the signal conductor layer in the first direction and below the first ground conductor layer in the second direction;

the first hollow portion overlaps the first ground conductor layer when viewed in the up-down direction;

in the first section, the multilayer body includes a first spacer that faces the first hollow portion; and in the first section, a length of the first spacer in the up-down direction is equal to or less than a maximum value of a length of the first hollow portion in the up-down direction.

17. The transmission line according to claim 16, wherein the first spacer projects in the second direction from a first surface of the first hollow portion; and a length in the up-down direction from an end of the first spacer to a second surface of the first hollow portion that is below the first surface of the first hollow portion in the second direction is shorter than the length of the first hollow portion in the up-down direction in the first non-overlapping region.

18. The transmission line according to claim 16, wherein the first spacer projects in the first direction from a second surface of the first hollow portion; and a length in the up-down direction from an end of the first spacer to a first surface of the first hollow portion that is above the second surface of the first hollow portion in the first direction is shorter than the length of the first hollow portion in the up-down direction in the first non-overlapping region.

19. The transmission line according to claim 16, further comprising:

a second ground conductor layer in the multilayer body below the signal conductor layer in the second direction and extending in the front-back direction to overlap the signal conductor layer when viewed in the up-down direction; wherein the multilayer body includes a second hollow portion;

the second hollow portion is below the signal conductor layer in the second direction and above the second ground conductor layer in the first direction;

the second hollow portion overlaps the second ground conductor layer when viewed in the up-down direction;

the multilayer body includes a second spacer that faces the second hollow portion;

in a cross section orthogonal to the front-back direction, a second overlapping region is a region in the second hollow portion in which the second hollow portion overlaps the second spacer in the up-down direction, and a second non-overlapping region is a region in the second hollow portion in which the second hollow portion does not overlap the second spacer in the up-down direction; and a length of the second hollow portion in the up-down direction in the second overlapping region is shorter than a length of the second hollow portion in the up-down direction in the second non-overlapping region.

20. An electronic device comprising the transmission line according to claim 16.

* * * * *